United States Patent [19]

Borie et al.

[11] 4,096,566
[45] Jun. 20, 1978

[54] MODULAR SIGNAL PROCESSOR HAVING A HIERARCHICAL STRUCTURE

[75] Inventors: Jean-Claude Borie, Antibes; Alain Couder, LaGaude; Alain Dauby, Nice; Michel Demange, St. Jeannet; Gerald Lebizay; Michel Lechaczynski, both of Nice, all of France

[73] Assignee: International Business Machines Corporation, Armonk, N.Y.

[21] Appl. No.: 641,202

[22] Filed: Dec. 16, 1975

[30] Foreign Application Priority Data

Dec. 27, 1974 France .................. 74 43561

[51] Int. Cl.² .............. G06F 3/05; G06F 7/38; H04J 3/12
[52] U.S. Cl. .................................. 364/200
[58] Field of Search .......... 340/172.5; 179/15 AL, 179/18 FC, 15 BY; 325/38 B; 364/200 MS File, 900 MS File, 102, 111

[56] References Cited

U.S. PATENT DOCUMENTS

| | | | |
|---|---|---|---|
| 3,252,149 | 5/1966 | Weida et al. | 340/172.5 |
| 3,374,465 | 3/1968 | Richmond et al. | 340/172.5 |
| 3,445,822 | 5/1969 | Driscoll | 340/172.5 |
| 3,492,435 | 1/1970 | Inose et al. | 179/18 FC |
| 3,496,301 | 2/1970 | Kaenel | 179/18 FC X |
| 3,579,200 | 5/1971 | Davis et al. | 340/172.5 |
| 3,634,830 | 1/1972 | Baskin | 340/172.5 |
| 3,710,324 | 1/1973 | Cohen et al. | 340/172.5 |
| 3,728,492 | 4/1973 | Cappetti et al. | 179/18 FC |
| 3,761,637 | 9/1973 | Henrion | 179/15 BY X |
| 3,787,673 | 1/1974 | Watson et al. | 340/172.5 X |
| 3,810,101 | 5/1974 | Avery | 340/172.5 |
| 3,820,079 | 6/1974 | Bergh et al. | 340/172.5 |
| 3,886,524 | 5/1975 | Appelt | 240/172.5 |
| 3,902,165 | 8/1975 | Artom | 340/172.5 |
| 3,924,077 | 12/1975 | Blakeslee | 179/15 AL |
| 3,924,240 | 12/1975 | Given | 340/172.5 |
| 3,962,685 | 6/1976 | Belle et al. | 340/172.5 |

*Primary Examiner*—Melvin B. Chapnick

[57] ABSTRACT

A modular digital signal processor based on a master-slave architecture has the capability of expanding its processing power by aggregating additional modules in a tree type structure. In such a processor the control functions are subdivided into groups, each for performance in a distinct control unit. One or more of the control units can perform a master function with respect to one or several slaved control units and can itself be a slave to a higher level control unit. The arithmetic data functions of the processor are performed in pipe line multiplier-accumulator units (PMAU), each of which is controlled by, instructions from an associated control unit.

6 Claims, 22 Drawing Figures

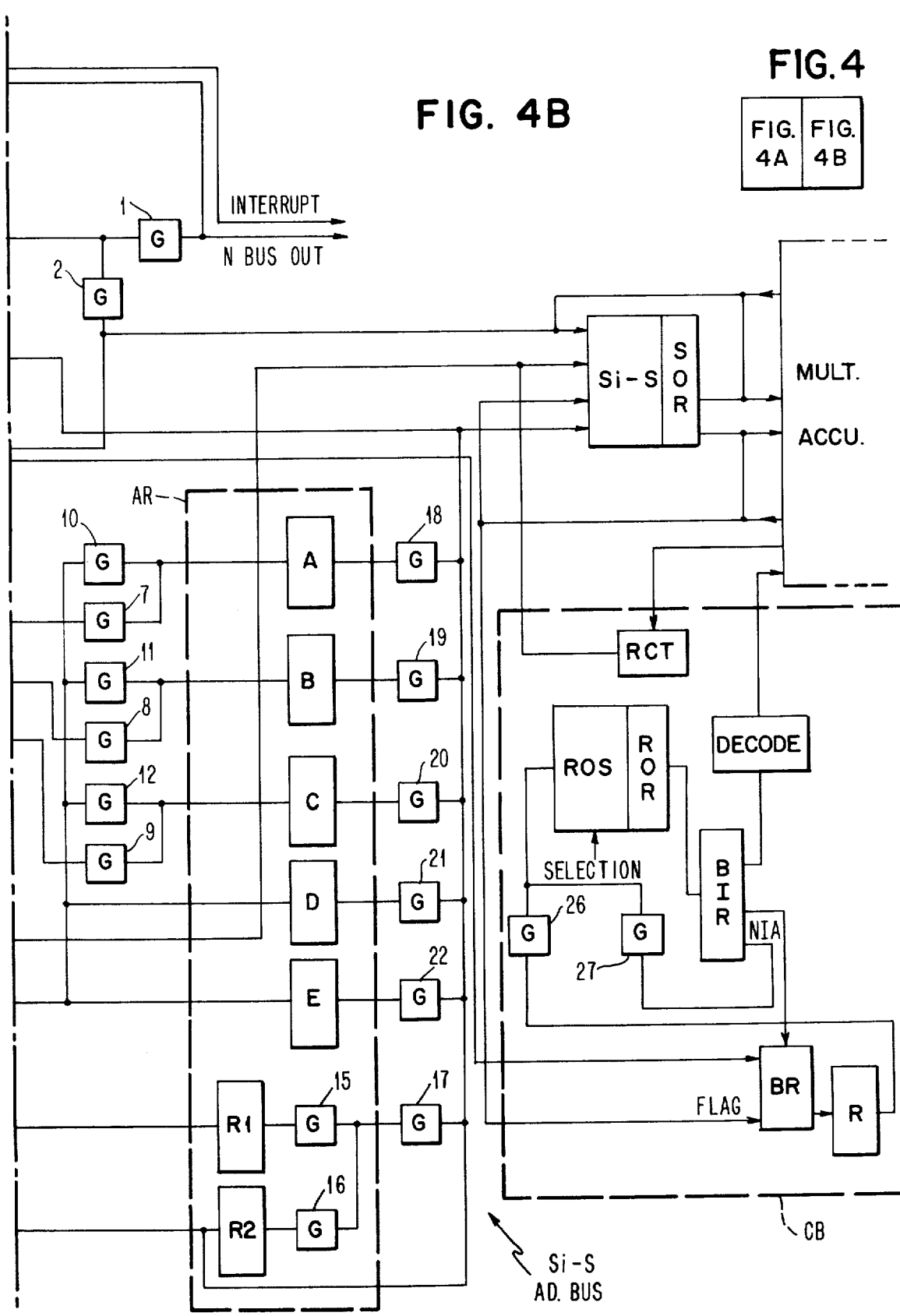

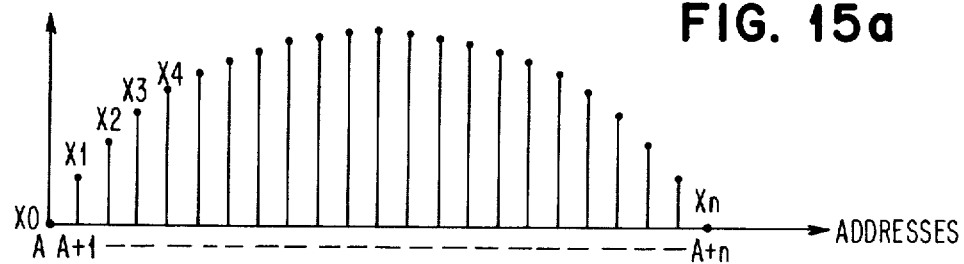
FIG. 15a
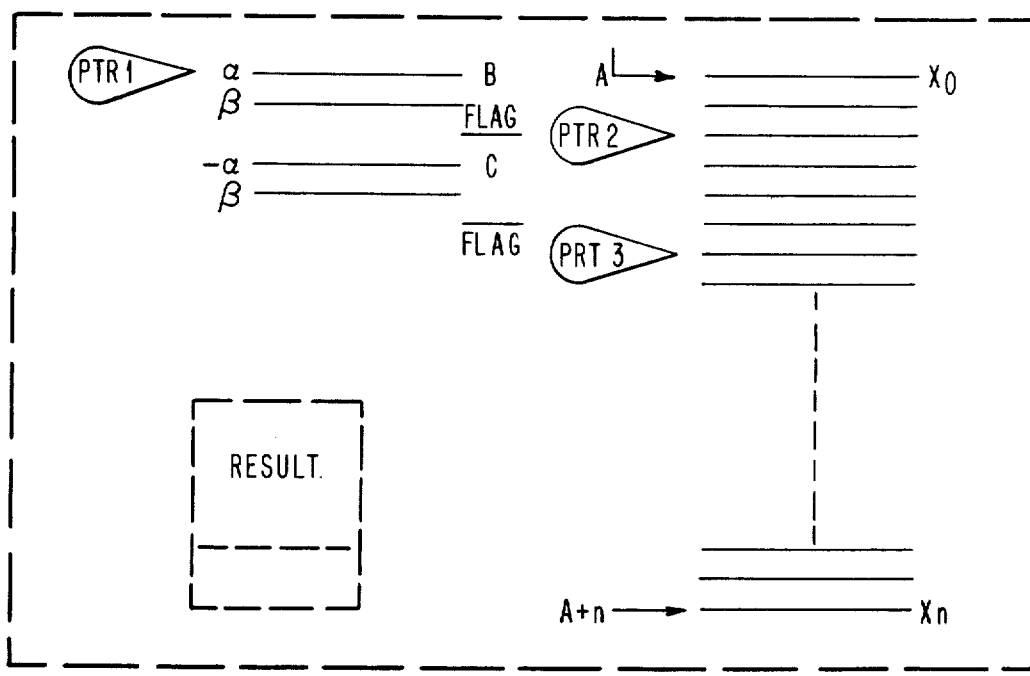
FIG. 15b
FIG. 15c
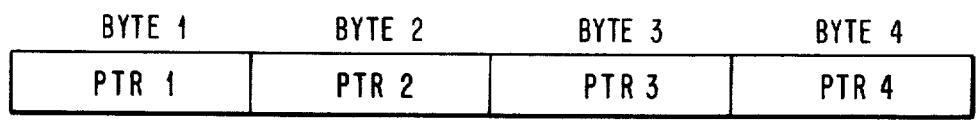

MODULAR SIGNAL PROCESSOR HAVING A HIERARCHICAL STRUCTURE

OBJECTS OF THE INVENTION

An information bearing signal after transmission over a communication line normally needs to be submitted to a number of processing steps before it is usable to provide information to the receiver. For instance, an information signal emitted by a source should be adapted, first of all, to the characteristics of the transmission medium between the source and the receiver, and then to the characteristics of the receiver itself. Although only the source and receiver are considered here, in a broad sense, one may mention, as an example, the case of information transmission for which a modulation operation is required on the emitting end and is followed by a demodulation operation at the receiving end.

It appears that most of the problems involved in signal processing bear a number of similarities. These problems can usually be resolved by appliction of some relatively simple basic mathematical operations. Also, the quantity of data required to be available to carry out each processing step, is generally low, but the available data should be regularly refreshed with new data as received. Therefore, it is necessary to hold previously received data signals for a short time.

Particular system arrangements have been developed for signal processing, taking into account the presence of these characteristics common to the various operations to be performed, and also considering the specific characteristics of each operation. However, these structures of the prior art are not versatile enough or do not cover enough functions to be of general utility.

The present invention overcomes these disadvantages by building the system with modular structure. The modules are grouped in a way to perform the required processing operation. Additionally, because of the modular structure of this invention, it is possible to increase the processing ability of a system, by simply providing additional modules to reinforce some elements of the system.

These and other objects, advantages and features of the present invention will become more readily apparent from the following specification taken in conjunction with the drawings.

BRIEF DESCRIPTION OF THE DRAWINGS

FIG. 4 is a schematic showing how FIGS. 4A and 4B are to be connected.

FIGS. 4A and 4B, when combined present a detailed view of a part of FIG. 3.

FIG. 15a is a detail showing how a signal can be synthesized from values stored in a table.

FIG. 15b is a diagram showing the arrangement in storage of data for the FIG. 14 structure.

FIG. 15c shows the format of a control word.

SPECIFICATION

Throughout the drawings certain abbreviations have been utilized in order to converve space and provide complete figures on a single sheet thus facilitating understanding. The table below lists the abbreviations and their meanings.

| | |
|---|---|
| IS-E | Instruction Store-Engine |
| I/OP | I/O Port |
| PMAU | Pipe Line Multiplier Accumulator Unit |
| IBA | Inter Bus Adapter |
| IR | Instruction Register |
| AR | Address Register |
| SiS | Signal Store |
| NBI | Native Bus Interface |
| ADD | Adder |
| MULT ACCU | Multiplier-Accumulator |

Figure 1:
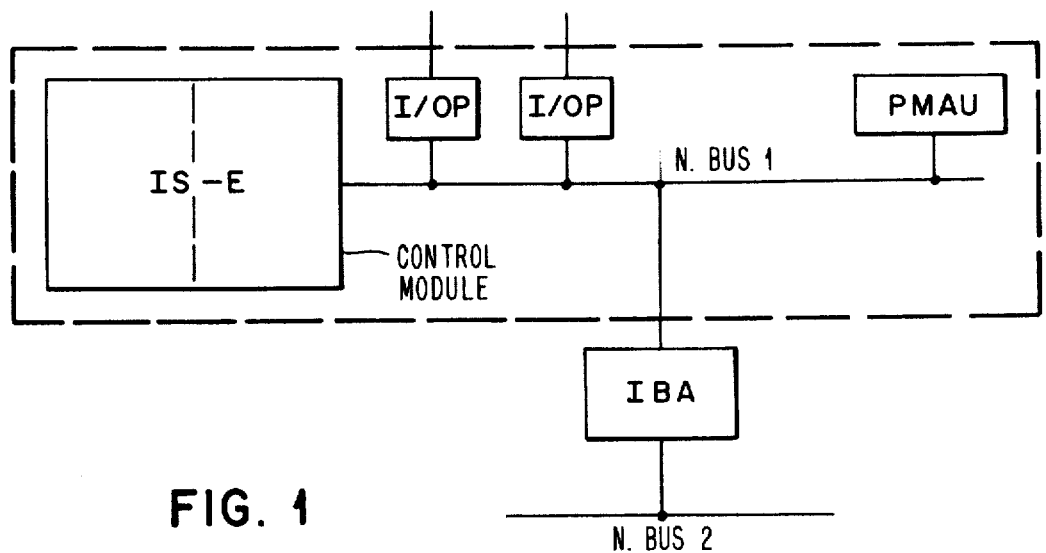
FIG. 1 shows a functional diagram of a sub-system of the invention.

This invention relates more particularly to digital signal processing. After the signals to be processed have been sampled and the magnitudes of the samples are converted to a digital value, the processing requires the execution of some mathematical operations, including a very simple and very useful basic operation, namely the multiplication of two numbers followed by an accumulation of the products of a sequence of multiplications. Therefore, the disclosed system is designed around two main modules, the first carrying out the above-indicated arithmetic operations, and the second controlling the execution of the operations. The computing and control units are interconnected through a common bus (N BUS) which is provided with gates (I/O P) giving access to external elements requesting the execution of operations and supplying or receiving data. The elements of a sub-system of this type are arranged as shown in FIG. 1, in which the control unit, computing unit, and gates bear references IS-E, PMAU and I/O P respectively. An adapting unit IBA ensures the interconnection between N-Busses 1 and 2, i.e., between two sub-systems.

Figure 2:
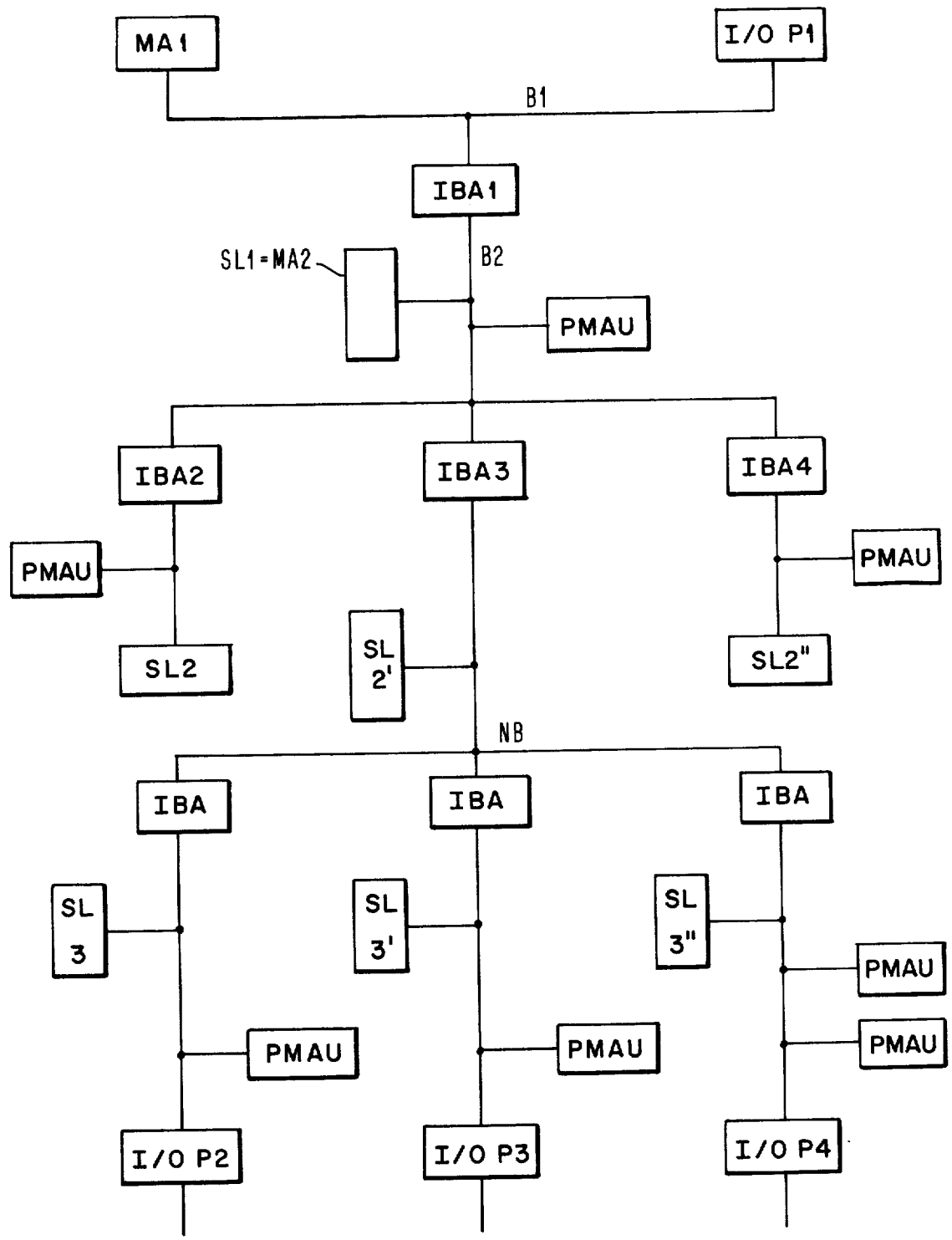
FIG. 2 shows a functional diagram of a tree-type structure combining a plurality of the modules of the invention.

By using modules of this type in the signal processing system, the system is provided with a major quality, namely versatility. In effect, the whole system can be arranged to assign a hierarachy to the modules: each control unit IS-E, can be placed to be dependent upon and, therefore be the salve of, another control unit functioning as a master. But each slave IS-E can, in turn, be the master of another control unit. Thus, a tree type structure of the type shown in FIG. 2 is obtained. At the top of the tree, there is a control unit MA1 operating as an absolute master. A gate I/O P1 enables a terminal or some other external element to be connected to the master MA1, through a bus B1. In this case, the master controls a slave SL1 through an adapter IBA1 provided on the bus. But slave SL1 also acts as a master MA2 of three control units SL2, SL2' and SL2" connected to it through the three adapters IBA2, 3, and 4. Module SL2', in turn, controls three slaves SL3, SL3' and SL3" provided with three associated gates I/O P2, I/O P3 and I/O P4.

Master MA1 controls the processing of the whole system: it monitors the functions directed by slave SL1 and controls the connection with the element associated with gate I/O P1. But slave SL1 also assigns some of its own tasks to its slaves SL2, SL2' and SL2" and so on.

The system is completed by connecting computing units PMAU connected to the different busses as required.

Such a design enables, by adding slaves, any required reinforcement of the parts of the system which are not powerful enough to perform their assigned operations.

The various above-indicated modules will be described below.

Computing unit PMAU could be autonomous serial parallel multiplier provided with an application program. However, it appears to be more efficient, to connect it with a direct dependency, on the control unit belonging to the same sub-system. Then, the heart of the PMAU unit simply consists of a multiplier of two numbers $a_i$ and $x_i$, followed by an accumulator. The multiplier is a device well known in the art, and in particular, it can be chosen among the ones described by O. Mac-Sorley in the article entitled, "High Speed Arithmetic in Binary Computers," published in the Proceedings of the IRE of January, 1962, starting at page 67.

As to the accumulator part, it can simply be a two-input adder feeding a register. Looping the output of the register back to the second input of the adder will enable it to perform the accumulation function on the multiplier products.

Therefore, the accumulator fed by the multiplier, can compute the following equation:

$$y = a_1x_1 + a_2x_2 + \ldots + a_nx_n = \sum_{i=1}^{n} a_ix_i.$$

The PMAU unit can, under instructions from the control module IS-E, also carry out other operations as:

$$Z = \Sigma\, ax - \Sigma\, by$$

or $$Y + jZ = \Sigma[(a+jb)(x+jy)]$$

Starting from these basic operations, the PMAU unit performs a number of functions or combinations of function under the control of microprograms. It receives from its control unit IS-E, a control word CW defining the function to be performed, therefore the microprogram to be used. In the embodiment chosen as an example, the control word CW is a word of 4 bytes, three of which are address pointers to be described later on while the fourth one (Op. Code) designates the function. The bits of the Op. Code can be defined as:

Bit 1: Sign of the arithmetic operation: i.e.,
  0 for +
  1 for −
Bits
2 to 4:
  Requested type of function:
  001 transversal filter
  010 complex transversal filter
  011 recursive filter
  100 linear correction of a series of constants
  101 multiplication by a constant
bits
5 to 7: Jump value $j$.

Figure 3:
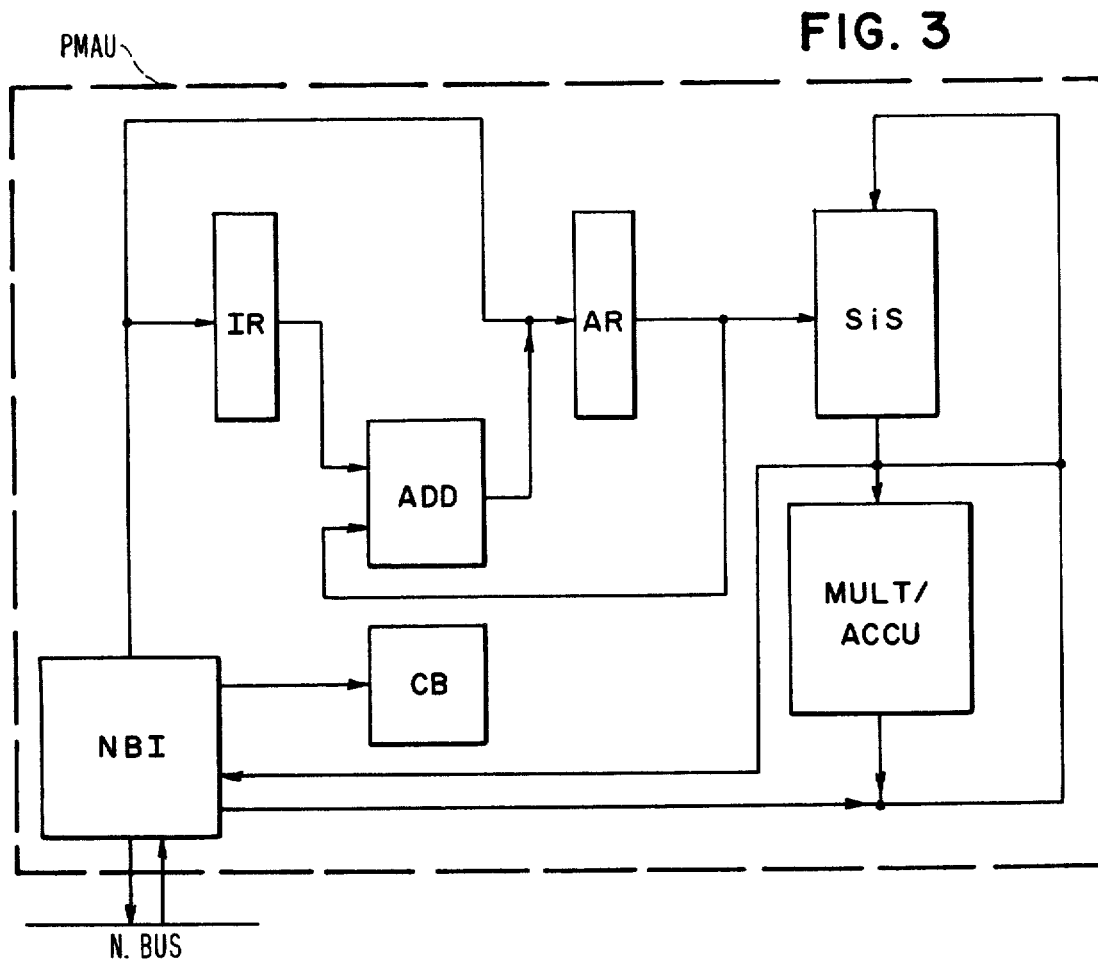
FIG. 3 shows a block diagram of the computing unit of one of the modules of the invention.

The PMAU functional diagram shown in FIG. 3 may now be understood. It includes the above-mentioned multiplier (MULT) and accumulator (ACCU) which are provided with their operands from a signal storage Si-S. This storage is addressed by a set of address registers AR, these addresses being developed in an adder ADD associated with another set of registers named "increment registers" and bearing reference IR. The external connections are made through an interface device NB1 connecting the N-Bus of the module to the input and output of storage Si-S, and to the inputs of registers IR and AR. A control device CB controls the operations of the PMAU unit.

An address is assigned to each PMAU. Thus, in operation, a comparator or decoder included in device NB1 will detect a CW addressed to it by decoding the associated address part of the word.

The output of the accumulator ACCU is always fed back to the input of storage Si-S, which enables the logic part of the PMAU to be less time dependent on the cycling of the multiplier-accumulator computing element. The system is not dependent on the duration of the cycle of this element and therefore, is not restricted by the speed of the technology used for building the element. It is, however, necessary to provide a means indicating to this element when it should process the last operand and thereafter indicating to storage Si-S that the result is available as soon as the computation is completed.

The reading out of the writing into storage Si-S functions are controlled by interface NB1 which passes the addresses in Si-S of the information which is to be interchanged with the PMAU.

Figure 4A:
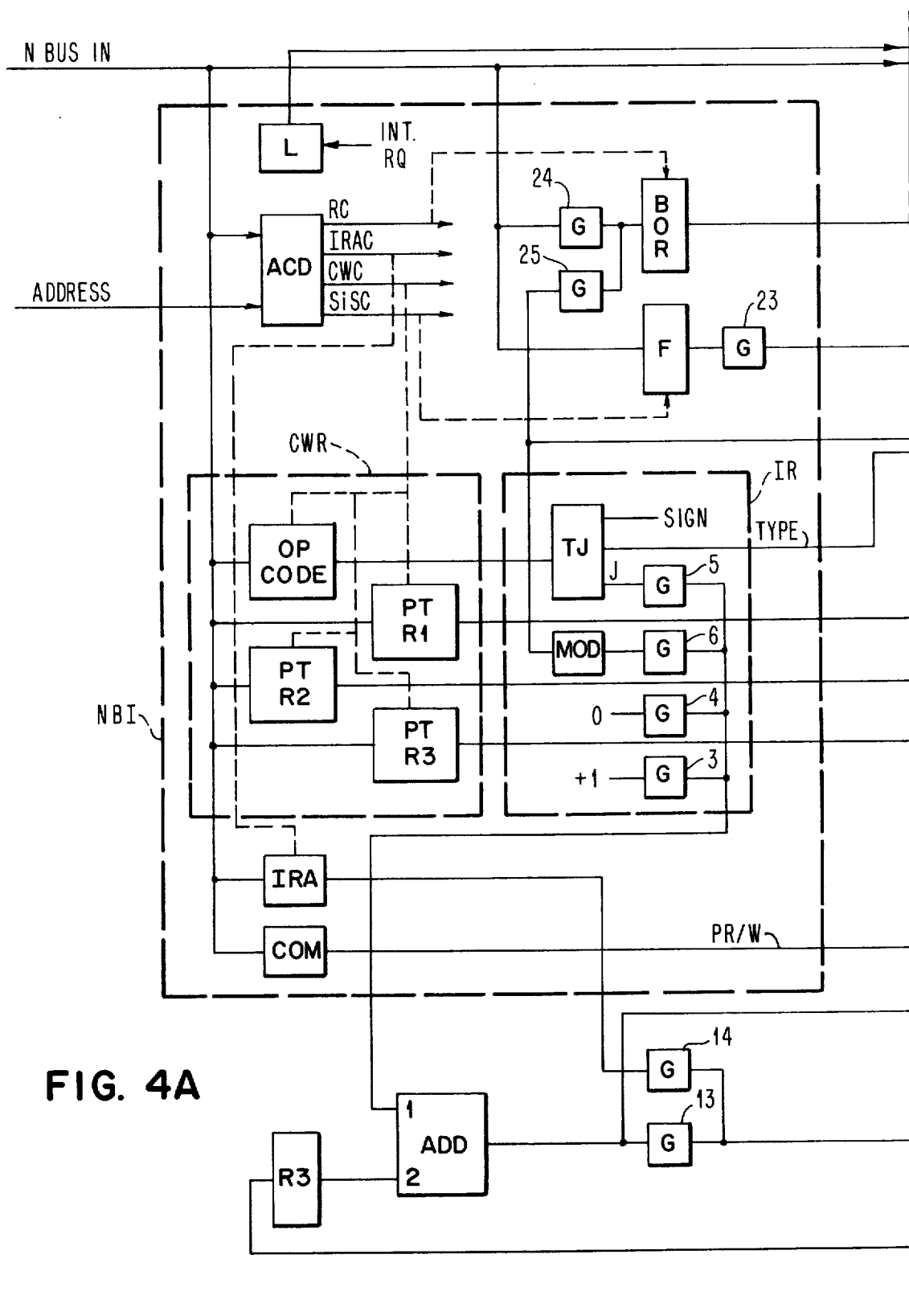

FIG. 4 comprised of FIGS. 4A and 4B shows more details of the PMAU elements. The interface NM1 FIG. 4A with the N-Bus of FIG. 3, includes an address controlled decoding device ACD with two inputs. The first one (Address) is called the "personalization input" and is used to assign an address to the associated PMAU unit on building the system. The second input is connected to the N-BUS. Also, the ACD unit is provided with four outputs bearing references RC, IRAC, CWC and SISE, respectively. The interface also includes eight registers connected to the N-Bus.

Four of these eight registers constitute a group referenced CWR and the other four bear designation COM, IRA, F and BOR. The input of register BOR is connected to the N-Bus through a gate 24 and to the output of storage Si-S FIG. 4B through a gate 25. The output of register BOR is connected to the N-Bus through a gate 1, and to the input of storage Si-S through gate 2. The output of register COM is connected to a reading or writing preparation control line PR/W which goes to an input of storage Si-S. The other registers are mainly used for modifying the addresses sent to storage Si-S and therefore, are connected to an assembly of the increment registers, address registers and adder ADD. In addition, interface NB1 includes a latch L the input of which is connected to control device CB (FIG. 3) and the output of which is connected to an interrupt line of the N-Bus.

As seen above, the PMAU unit is designed around multiplier-accumulator MULT/ACCU which is fed with its operands by storage Si-S. The output of the accumulator is stored back into Si-S. Therefore, the Si-S addressing device should provide both the addresses of the operands and the addresses for storage of the results of the calculations performed by MULT/ACCU. It will be seen later on that there is no fundamental difference between these two information operands and that any operand can be the result of a previous calculation. The addressing device includes the set of addressing registers (AR) FIG. 4B, of which registers A, B, and C are loaded by the set of control word registers CWR or by the output of adder ADD FIG. 4A. One of the inputs of said adder ADD is linked to the set of increment control registers IR. The second input of ADD is connected to the outputs of address registers (AR) through a register R3.

Registers IR are of two types. Some contain a fixed value 1 or 0 and are respectively linked to input (1) of adder ADD through gate 3 or 4. The other ones, bearing references TJ and MOD, are provided to contain a settable variable value. The input of register TJ is linked to the output of register OP-Code of set CWR, and provides the three outputs referenced SIGN, Type and J. Output J is linked to input (1) of adder ADD through a gate 5. The input of register MOD is connected to the output line of storage Si-S. Its output is connected to input (1) of ADD through gate 6.

There are seven registers in group AR FIG. 4B and they have references A, B, C, D, E, R1 and R2. The inputs of registers A, B, and C are respectively linked to the outputs of registers PTR1, PTR2 and PTR3 of set CWR, through gates 7, 8, and 9. The inputs of D and E are directly linked to the output of adder ADD, which output is also linked to the inuts of A, B, C and R1 through gates 10 to 13 inc. The output of register IRA FIG. 4A is linked to the input of R1 through gate 14. The outputs of R1 and R2 are linked to a same line through gates 15 and 16 which line is connectable to the addressing bus of storage Si-S through gate 17. The outputs of registers A to F are also linked to this same addressing bus through gates 18 to 23 inc. This addressing bus is also looped back to the input of R2 and to input (2) of adder ADD through buffer R3.

Control device CB for the multiplier-accumulator includes a read-only memory ROS provided with an output register ROR. The output of ROR is linked to the input of a buffer BIR provided with three outputs. One of its outputs is linked to a decoding device, the second one is connected back to the input of memory ROS through gate 27, and the third one is linked to the input of a branch control device BR, the output of which passes through buffer R and gate 26 back to the input of ROS. The input of device BR also receives the output "Type" of register TJ FIG. 4A, (bits 2 to 4 of the byte Op-Code of the control word CW to be executed) and a flag signal issued from storage Si-S. The output of the Decode unit is linked to the input of the MULT/ACCU unit.

Finally, device CB includes a result transfer control circuit RCT, which may be a latch, controlling the writing of the accumulator results into storage Si-S. A second input of the write control circuit of storage Si-S is linked to output PR/W of register COM. This set of devices enables the providing of micro-instruction routines to the PMAU, for executing functions of function combinations of the type described above.

The PMAU unit operates as follows. When circuit ACD recognizes its unit address in data taken from the N-Bus, it knows that it should pick up the next following data on the N-bus. This following data allows ACD to determine which one of its output should be energized. if it detects an instruction requesting an access to signal storage Si-S, output Si-SC is energized. This output causes the next byte appearing on the N-Bus to be loaded into register F. This byte is the address in storage Si-S of the data which is requested by the control unit. The next byte is a control byte directed towards register COM. Actually, this register can receive only one bit position and if this bit is equal to 1, the corresponding order (PR) from the register requires a preparation for reading storage Si-S. In this case, the information fetched out of the addressed storage location is buffered into register BOR through gate 23. It is then necessary to wait for ACD to decode a further reading control instruction and to energize its output RC Thus unloading register BOR into the N-Bus through gate 1. If, on the contrary, the bit stored into COM is equal to zero, the received order involves a writing into storage Si-S. The opening of gate 24 allows the loading of data applied to the N-Bus input into registr BOR. Register BOR is, then, unloaded through gate 2 into storage Si-S, at the address indicated by the contents of the byte previously loaded into register F and under the reading control provided by the output of register COM.

When ACD decodes an order byte calling for loading the set of registers CWR, its output CWC is energized. In this case, ACD waits for the start of a CW and the four bytes next appearing at the N-b input are respectively directed towards registers PTR1, PTR2, PTR3 and Op-Code forming the register set CWR.

When the PMAU unit is available for execution of the CW, it provides this information to the control unit by applying a 1 to latch L of NBI, through input INT, RQ of this latch. This will normally request a new CW from the control unit. In the meantime, the CWR is emptied into the IR and AR registers. More particularly, the OP. Code is transferred into TJ and PTR1, PTR2 and PTR3 are emptied into registers A, B, and C, respectively through gates 7, 8, and 9. The bit in the first position in the contents of TJ indicates the sign (s) of the operations to be carried out by MULT/ACCU. Bits 5 to 7 are used for composing the addresses of Si-S whilebits 2 to 4 define the type of the function to be performed by the PMAU unit. It will be set out later what this means but for now, it should be noted that these bits enable BR of device CB to choose one of the microprograms stored in ROS. In fact, it is only necessary to choose the first instruction of each microprogram, then the microprogram carries on with the succeeding instructions by means of a first field NIA contained in each instruction which field is transferred from ROS to IR or by means of a second field establishing another selection through BR. The remainder of the contents of the IR registers is decoded and used to control the operations to be performed for each function type of the PMAU unit. Device DECODE controls, in particular, the transfer of the ACCU result towards the N-Bus. In effect, after the ACCU has obtained the result, device RCT is activated to control a readout and DECODE controls the transfer of said result to the N-Bus through gate 25 and BOR.

All the data transfers between PMAU and N-Bus are performed through storage Si-S. Therefore, the ACCU results should be written into this storage. The determination of the required addresses depends on the function being performed. The transfer is, therefore, determined by DECODE in accordance with the bits TYPE provided to DECODE by the OP-Code of the CW being processed. Here, two fundamental principles have been chosen. First, when a new address to be generated is independent of the result of the previous calculation, the writings into Si-S are sequentialy carried out. The sequence is initialized by control unit IS-E (FIG. 1) sending an instruction, the first byte of which is decoded by ACD so that its output IRAC is energized, which involves the loading of register IRA with the second byte of the same instruction. The sequence so initialized, proceeds until a new sequence initializing instruction is provided by control unit IS-E. In this case, the procedure causes each address to be placed into R1 and incremented by one by ADD. The second principle applied for determining the addresses for writing the results of calculation into Si-S, is used when the PMAU unit determines the storage address according to the function performed by said unit. In this case, it is normally calculated after each operation, but to avoid the interruptions needed for the calculation of these addresses one by one, it is possible to calculate and to queue several addresses into register R2.

Figure 5:
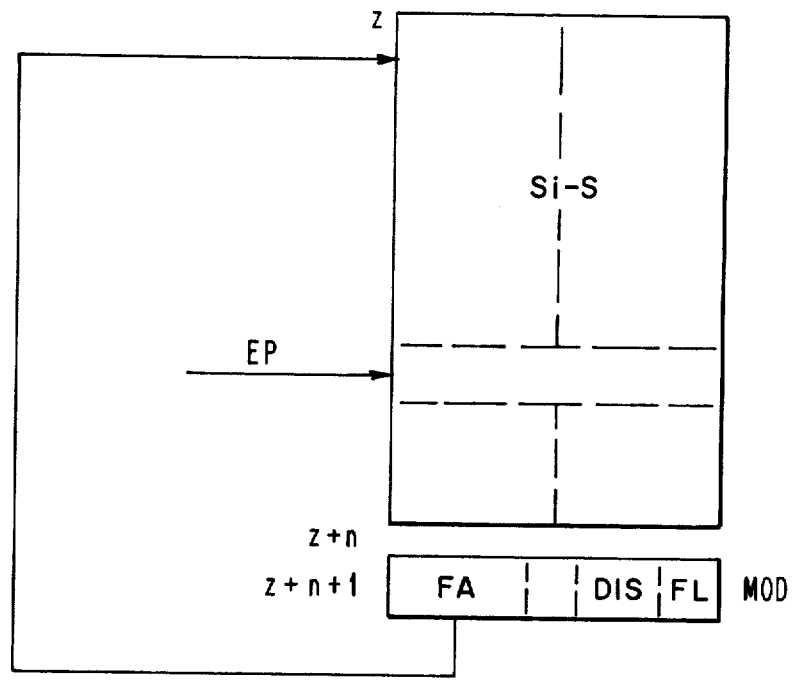
FIG. 5 shows the data storage arrangement of the computing unit.

For a better understanding of these addressing problems, let it be assumed that one has to use, see FIG. 5, a given table of constant length included between addresses $z$ and $z+n$ of Si-S, the contents of which should be progressively refreshed after each reading of the table. More particularly, the position of the initial reading is indicated by an address pointer EP which moves progressively. For this purpose, device CB has placed in address $z+n+1$, a word called "modifier" (MOD) including in particular, a flag (FL) and the indication in a field FA, of the first address $z$ of the table. The reading of the table begins at the address indicated by the pointer EP stored by R2, the contents of said address being, then, replaced by the new data to be placed into the table. The pointer value is decremented by one unit by algebraical adder ADD and placed into R2 again. The table reading is carried on by incrementing the reading address in R1 by one each time, until FLAG is detected, which causes the substitution of the contents of field FA in MOD (normally address $z$) for the next reading address then in R1. Then, sequential readings resume up to the pointer in R2 or up to some other end of table address.

This first method is particularly useful in the performance of a filtering function which can be done by the PMAU unit. In this case, the stored table contains data samples $x_i$ of the signal to be filtered and the foregoing operation simulates the functions of the delay line required in the filtering operation.

In some applications, it may be necessary to use only some of the data samples in the table, one out of two or three, for example. Thereore, it will be necessary, when reading the X table, to perform repetitive jumps: in this case, bits 5 to 7 of the fourth byte of (CW), i.e., jump bits (J), are to be used and the Si-S address in R1 is incremented by J from TJ through gate 5 after each reading of Si-S.

When the same function should be repeated several times (same CW) on various data groups, the operations should be chained. The presence of flag FL is used to mark the end of each data group. A function chaining operation of the contents of a storage SiS is decribed below. It is assumed that there are three data groups x, y and z and three coefficient groups a, b, c. The coefficients are sequentially arranged and separated by a word identified by a flag. The meaning of the flag can differ from one function to another, but its presence with the coefficients always indicates the end of a set of coefficients. Sets x, y, z are placed in different locations. Within a same set, the first method described above is used to alow sequential readings and refreshing of the data. But, in order to chain the operations by going from a set to another one, field DIS is used, the contents of this field being added to the pointer address of the set in use, to provide the pointer address of the next set.

In the described example there are three fields for each modifier: a field FA indicating the first address of the group, a displacement field DIS and a flag field FL. Two other fields can be provided to control the changes of sign to be carried out and the resetting of the accumulator, respectively.

As indicated above, the PMAU unit is arranged to be able to carry out certain mathematical operations, all of them using the basic operation $Y = \Sigma ax$. From this, most functions required for processing a data signal can be carried out. Some of these functions have been already indicated and include the filtering functions which will now be described in detail to illustrate the operation of the PMAU unit.

The transversal filtering function is mainly performed by the execution of the basic operation $Y = \Sigma ax$. Normally the combination of the calculation power of the PMAU unit and its operating speed is so much higher than the data rate at the input of a system linked to it, that said PMAU unit is capable of performing several filtering functions in an interspersed manner. Because of this, it is necessary to provide an interim storage arrangement of the data storge Si-S. Assume for example, that three transversal filtering functions are to be carried out:

| (1) $Y = \sum_{i=1}^{n} a_i x_i$ $Y' = \sum_{i=1}^{n} b_i x'_i$ $Y'' = \sum_{i=1}^{n} c_i x''_i$ | or (2) $Y = \sum_{i=1}^{n} a_i x_i$ $Y' = \sum_{i=1}^{n} a_i x'_i$ $Y'' = \sum_{i=1}^{n} a_i x''_i$ | or (3) $Y = \sum_{i=1}^{n} a_i x_i$ $Y' = \sum_{i=1}^{n} b_i x_i$ $Y'' = \sum_{i=1}^{n} c_i x_i$ |
|---|---|---|

It is seen that to calculate the samples of Y, Y' or Y", a set of n coefficients of type a, b, or c and a set of n data words X, X', or X" should be available as required.

Then the function chaining method as described above should be used. In this case, the flags have the following meanings:

Data flag:
  00 No flag
  01 End of set
  10 Last set
Coefficient flag:

00 No flag
01 Chain another set of coefficients
10 Chain using the same set of coefficients
11 End of the CW execution The flag indicates whether it is necessary to make a change of coefficient set and/or of data to compute the function being performed at this time.

If it is assumed that three coefficient sets, namely $a$, $b$, and $c$ are to be used, the PMAU unit will calculate series (1), i.e.:

$$Y = \sum_{i=1}^{n} a_i x_i, \quad Y' = \sum_{i=1}^{n} b_i x_i', \quad \text{and} \quad Y'' = \sum_{i=1}^{n} c_i x_i''$$

In this calculation, code flag 01 (end of set) is placed at the end of groups X and X' and code flag 10 (end of the last set) is placed at the end of X". The flag of coefficient sets $a$ and $b$ is 01, and the flag of coefficient set $c$ is 11.

It was seen above that the PMAU unit can also carry out an operation on complex numbers, of the following type:

$$Y + jZ = \Sigma [(a+Jb)(x+jy)].$$

For this, it calculates $$Y = \Sigma (ax - by) \text{ and } Z = \Sigma (ay + bx)$$

separately, by using the devices allowing a sequential operation as described above. In this case, it is necessary to change the manings of the two bits used as a flag as well as the assignments of the pointers of control word CW.

The flags become:

| Assignment | Code | Meaning |
|---|---|---|
| Data | 0 0 | No flag |
|  | 0 1 | End of set |
| Coefficients | 0 0 | No flag |
|  | 0 1 | End of coefficient set "a" |
|  | 1 0 | End of coefficient set "b" |

The modifier byte at the same address as the data flag contains altogether, the first data address, the displacement, an indicator to reset the PMAU accumulator and a sign change indication, as required.

The first pointer enables the fetching of new data out of Si-S, the second one is used to load new data into the corresponding table of storage Si-S and the third one is used to define the location of the first coefficient to be used, in Si-S.

Bits 2 to 4 of the fourth byte of CW, i.e., the one defining the operaion code, form 010, in this case, indicating that the complex transversal filtering function is to be performed.

The PMAU unit can also be operated to perform the recursive filtering function. As known in the art, this is a case in which each calculated data unit is subsequently used as input data. Then, it is necessary to use the other above-described possibilities of determining the addresses.

It should be noted that the recursive filtering function can be determined through various formulae. In this disclosure, the selected formula is the canonical form. Two cases are possible depending whether the direct canonical form or the cascade form is used. In the direct form, a sample $Y_i$ of the filtered signal is obtained from a sum of intermediate weighted signals with function Z.

$$Y_i = \sum_{i=0}^{n} a_i z_{k-i}$$

$$Z_k = X_k + \sum_{i=1}^{n} b_i \cdot Z_{k-i}$$

The formula giving $Z_k$ shows that the calculation of this sample used $n$ previously calculated sampls $Z_{i-1}$, $Z_{i-2}, \ldots Z_{i-n}$.

For the cascade form, the formulae become:

$$Y_i = a_o^n Z_k^n + a_1^n Z_{k-1}^n + a_2^n Z_{k-2}^2.$$

$$Z_k^1 = a_o^{j-1} Z_k^{j-1} + a_1^{j-1} Z_{k-1}^{j-1} + a_s^{j-1} Z_{k-2}^{j-1} + b_1^j Z_{k-1}^j + b_2^j Z_{k-2}^j$$

where $j$ is an integer varying from 2 to $n$.

$$Z_k^1 = X_k + b_1^1 Z_{k-1}^1 + b_2^1 Z_{k-2}^1$$

The difference between the computations for the direct form and the ones for the cascade form results from the use of the flags which are

| Assignment | Code | Meaning |
|---|---|---|
| Data | 0 0 | No flag |
|  | 0 1 | End of data set |
|  | 1 0 | End of set, chain with next filter |
| Coefficients | 0 0 | No flag |
|  | 0 1 | Use same data set |
|  | 1 0 | Change data set |
|  | 1 1 | End of coefficient sets |

The pointer number one of the CW is used for designating next data $X_k$. Pointer number two designates the first data of the first set and pointer number three designates the first coefficient.

In operation, the PMAU unit initializes the result address by transferring the contents of R1 into R2. Then, it fetches the first data out of storage Si-S and uses its location for the partial Z result. It fetches the coefficients and data while looking at the flags. As soon as a data flag 01 is detected, it fetches the first data on the table, saves the modifiers and starts again. When it finds a coefficient flag, it keeps the same data or changes depending whether this flag os 01 or 10, and it starts again. When it detects coefficient flag 11, it loads the new data $X_k$ into the multiplier and stops. If another filtering operation is to be chained with the previous one, the detection of data flag 10 causes a special loop operation to start while monitoring the last coefficient flag. Then, it loads the new data into the multiplier and proceeds to the next filtering operation.

As another type of function, the PMAU unit can linearly correct a series of numbers.

Here, it computes the following equation:

$$C_N = C_{N-1} + K_1 X + K_2 Y.$$

$C_N$ being the new term to be calculated, it is defined from preceding term $C_{N-1}$. $K_1$ and $K_2$ are constants and X and Y, data. In this case, result $C_N$ replaces the old value, i.e., $C_{N-1}$ in storage Si-S. This storage is arranged as follows. The first pointer of word CW determines the address of a modifier and coefficients K1 and K2 are respectively located in the addresses immediately following the one of the modifiers of X and Y.

In such an operation (FIG. 6), the PMAU unit fetches the modifier ot (step 1) to known the displacement to be used to go from the X set to the Y set and back. It holds the modifier (step 2). Then, it fetches $C_{N-1}$ out (step 3). If a significant coefficient flag (C FL) is detected, the operation is terminated. If not (C FL = 0) $C_{N-1}$ is multiplied by 1 and fed into its accumulator (step 4). It fetches $K_1$ out (step 5), then X (step 6) while searching for a data flag (D FL) (step 7). If it does not detect any data flag, it fetches $K_2$ (step 8) and Y out (step 9). It does the loop again by using next coefficient $C_N$. If it detects a flag, the producer is over.

Figure 6:
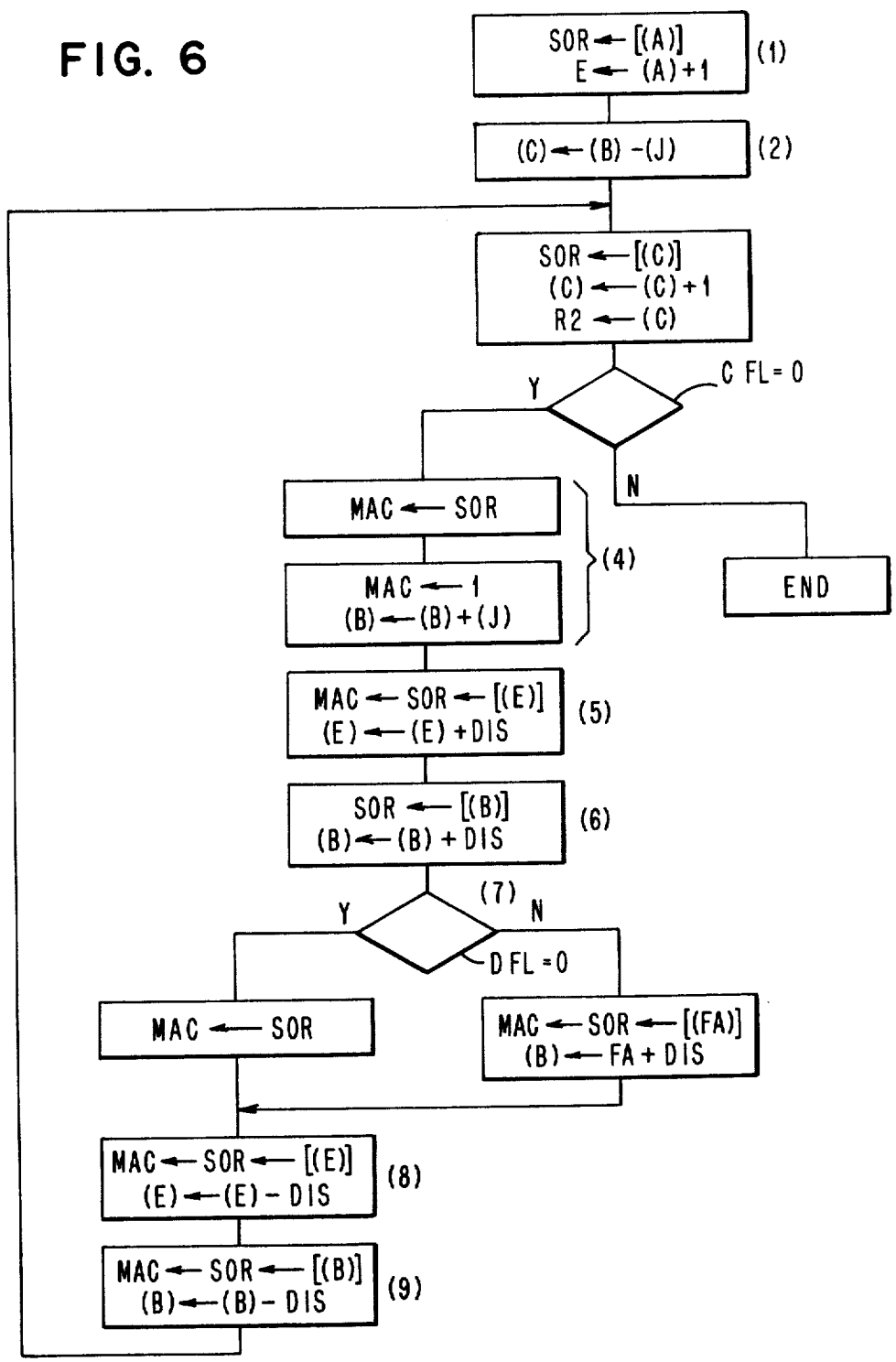
FIG. 6 is a flow chart of the controls of the computing unit.

The following references and conventions are used in the flow chart of FIG. 6:

A, B, C ... = Register A, Register B, Register C ...

(A), (B), (C) Contents of registers A, B, C ...

[(A)], [(B)], [(C)] Si-S addressed by the contents of register A, register B, register C ...

| | |
|---|---|
| C FL | Coefficient flag |
| D FL | Data flag |
| MAC | Multiplier/accumulator |
| SOR | Output register of storage Si-S |
| DIS | Displacement |
| (J) | Jump value |

The PMAU unit can also perform certain simpler functions as multiplications by a constant. Also, it can perform combinations of the above-described function by applying methods similar to the ones already described.

As mentioned above, each PMAU unit is controlled by a control unit (IS-E) which provides a control word CW for this purpose. The actuated PMAU unit signals, then, by delivering an interrupt instruction through L (FIG. 4A) to IS-E, that it has started carrying out the requested operation and that it registers CWR are available for receiving another CW. Thus, the CW executions are chained and the results are written into storage Si-S which is directly accessable by unit ISE for reading and writing operations. The control unit reads into the PMAU memory the results of the calculatons executed by the PMAU unit. Therefore the control unit has no purely mathematical calculations to do since they are performed by the PMAU unit. However, it has to control all of the terminal elements linked to its bus, namely one or several PMAU units, external units linked through gates I/OP and other sub-systems (slaves) which can be linked through IBA (see FIG. 2).

Therefore, the control unit is the intelligent module. After having loaded into its storage the program it is to execute, it operates to order and meet the requirements of the various modules under its control. For this purpose, it operates on a priority basis. Among the units linked to its N-BUS and requesting service, it searches for the one with the highest priority and this search is performed after each execution of an instruction by the control unit.

In a preferred embodiment, the control unit includes a storage IS and a logic section E. The latter as shown on FIG. 7, consists mainly of an instruction register IRM which can receive two words from IS, two stacks of operand registers SA and SB holding 32 and 64 bytes respectively, an arithemtic and logic unit ALU, an address forming circuit AdF, and additional registers whose functions will be described later on.

Assuming now that storage IS contains the program of operations to be controlled by control unit, a starting address is first loaded into address register ISAR to fetch an instruction out of storage IS.

This address is delivered by a next instruction address register NIAR device for handling the priority feature. The NIAR device includes as many registers as there are priority levels. In each register, the address of the next instruction of the program of that priority level is written after the execution of an instruction. Thus, before executing an instruction, the control unit scans all the elements which are under its control and linked to its N-BUS and will process only the one with the highest priority. Therefore, these levels are really interrupt levels since they can interrupt any program of lesser priority after the execution of any one of the lower priority instructions.

Each instruction fetched out of IS is loaded into register IRM which can, in this case, contain two words $W_0$ and $W_1$. The first one ($W_0$) provides the addresses of operands contained in one of the SA and one of the SB registers and on which operands an operation is to be carried out in the ALU unit. The operation of the ALU unit is controlled by one of the fields, namely ALU CTRL, of $W_1$. The result provided by the ALU CTRL, of $W_1$. The result provided by the ALU unit can flow several ways. It can go through register ALU Reg and be gated into the registers SA and/or SB through gates 31 and 32, or it may be gated out to the N-BUS through gate 33. Also, the result can be introduced into an address forming device AdF and there, as controlled by another field of $W_1$, supply the address of the next instruction of that program, i.e., the address to be introduced into the associated one of the NIAR registers.

Other exchanges with the N-BUS can be performed in the input direction, i.e., from the N-BUS towards control unit E, or in the opposite or output direction. In the input direction, the data buffers in a register REG In whose data can be gated by gate 35 either to the group of registers SB, or through gate 36 to the input Reg. A of the ALU unit. In the output direction, in addition to the above indicated possibilities, it is also possible to gate the SB outputs directly onto the N-BUS through gates 37 and 38.

Other transfers are performed through the remaining gates G.

The operation of the control unit begins with an initialization operation during which the first addresses of each one of the programs to be carried out by the unit, are loaded into the NIAR unit. Then, the elements linked to the N-BUS are scanned by the NIAR for interrupt requests. When one of them requires the service of the control unit or is ready to perform an operation under its control, it introduces its request. However, its next instruction will be performed only if it is provided with the highest priority among the requesting units. To improve the versatility of the system, it has not only a priority assigned to each input device on the N-BUS, but the possibility of introducing priorities defined by the programmer device has also been provided.

For this purpose, all the possibilities are provided, namely the programmer can cause the normal introduction of an interruption with the highest level (zero level) at the selected rate of a clock referenced TIMER (FIG. 7), or some priority levels can be masked to favor lower levels (by a MASK device), or at last, interrupt levels can be forced (by a PIRR device). The MASK and PIRR devices can be registers with as many bit positions in the output as there are possible interrupt levels. The programmer will load through N-BUS Regs in AND gate 35, a "one" or a "zero" into the bit position corresponding to the level to be masked or on the contrary to be forced.

Figure 8:
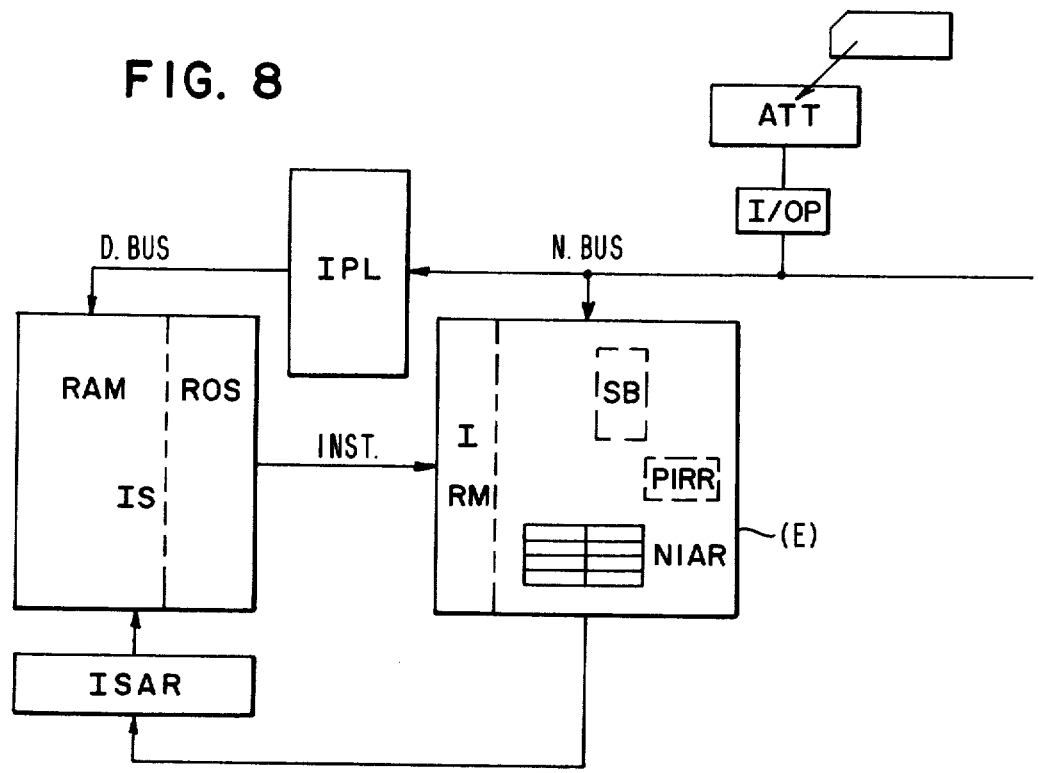
FIG. 8 schematically shows the data paths for initial self-loading of the control unit storage.

It was said above that the control unit itself is able to load into its storage IS, the programs which may have to be executed to control the modules dependent upon it. It should be noted that the architecture of this unit, as designed here, allows the performance of this function at low expense. The addition of a device corresponding to a simple register bearing reference IPL on FIG. 8 provides means for personalizing the control unit. For this purpose, the storage IS includes a read-only section ROS containing a loading program and a random access section RAM in which will be written the control unit application programs provided by a terminal ATT linked to the N-BUS through a gate I/OP. This terminal can be, for example, a card reader. FIG. 8 shows a block diagram of the loading system. The contents of the ROS going through register IRM starts the loading operation. It should be noted that the highest priority level (zero level) is assigned to ATT and that the device is maintained at this level by placing a "1" into the zero priority level cell of register PIRR. All the registers of the NIAR unit are reset but the one with the highest level in which the address of the first instruction of the loading program (address 00001 for example) is introduced.

Figure 7:
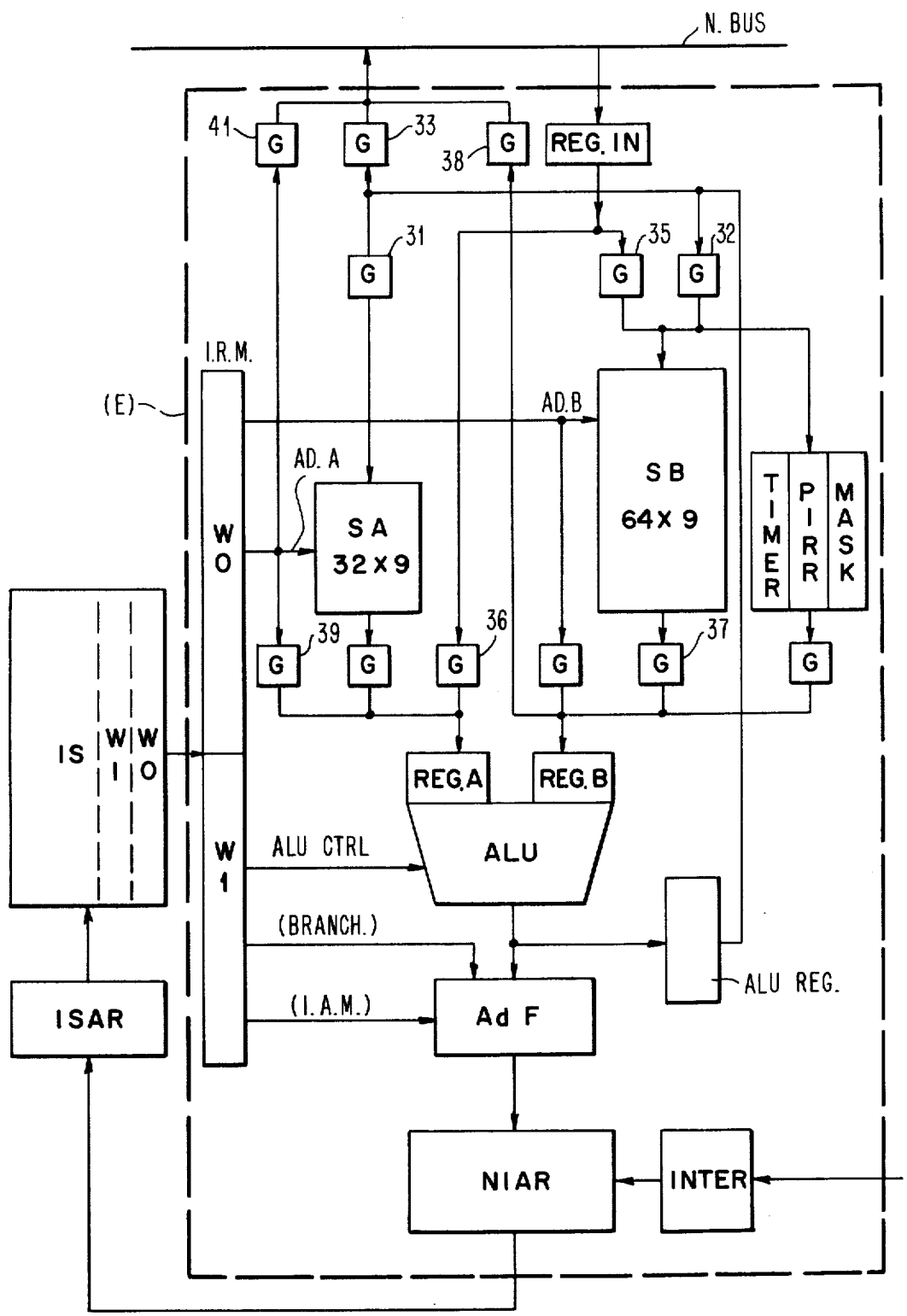
FIG. 7 is a block diagram of the control unit.

The presence of a binary "one" in the PIRR cell corresponding to the zero interrupt level, requires the execution of the loading program. Address 00001 is fed into the ISAR unit, which involves the reading of the corresponding position of storage IS, where an ATT reading instruction is found. An instruction and an address is fetched from ATT through the N-BUS, and the whole is loaded into one of the SB registers (FIG. 7). Then the instruction is transferred into register IPL by the control unit while the value of the RAM address which is to receive the instruction fetched out of ATT is fed into the ISAR unit, which directs the writing of the contents of register IPL into the selected storage address of the RAM unit. The foregoing will be called "IPL procedure" in the following description of the invention.

The data flow can be described as follows. Let us first assume that the execution of only one instruction is considered. When a unit linked to the N-BUS requires the service of the control unit, it introduces an interrupt request which will be taken into account by means of an INTER logic device (see FIG. 7). This extracts the contents of he NIAR register corresponding to the interrupt level of the requesting unit, namely the address in storage IS where the instruction to be executed by the control unit is stored. Thus, by using addressing register ISAR, an instruction is accessed, which instruction is transmitted to register IRM. The instruction includes two sections $W_1$ and $W_0$. $W_0$ contains either the address of registers SA and AB giving the operands to be used in the ALU unit, or values to be introduced directly through gate 39 into the Reg A of the ALU unit. $W_1$, sets the controls for the operation of the ALU unit. The result provided by the latter can be fed back to one of the registers of SA or SB, or of both, at the addresses already defined by $W_0$.

The address of the next instruction to be executed on the same priority level is generated by means of the BRANCH indication contained in $W_1$ or by using the ALU unitt. The new address is loaded into the NIAR register corresponding to the priority level being processed.

If the processed instruction relates to a unit linked to the N-BUS, its address is contained in the $W_0$ part of the instuction and passes to N-BUS through gate 41.

Actually, to provide an increase in its processing power, the control unit operates simultaneously on two instructions belonging to two different programs (odd-even). The NIAR registers are, therefore, arranged in two groups, one group processing the even interrupt levels, and the second one processing the odd interrupt levels. When two interrupt requests, one odd (1) and one even (P), are simultaneously set on, the control unit operates as follows. The priority device fetches out the P level NIAR contents which is, then, transferred into ISAR. The execution of this instruction is started in the control unit while the odd NIAR register 1 is addressed and feeds an address to ISAR which, in turn, address storage IS and loads IRM, and so on.

Figure 9:
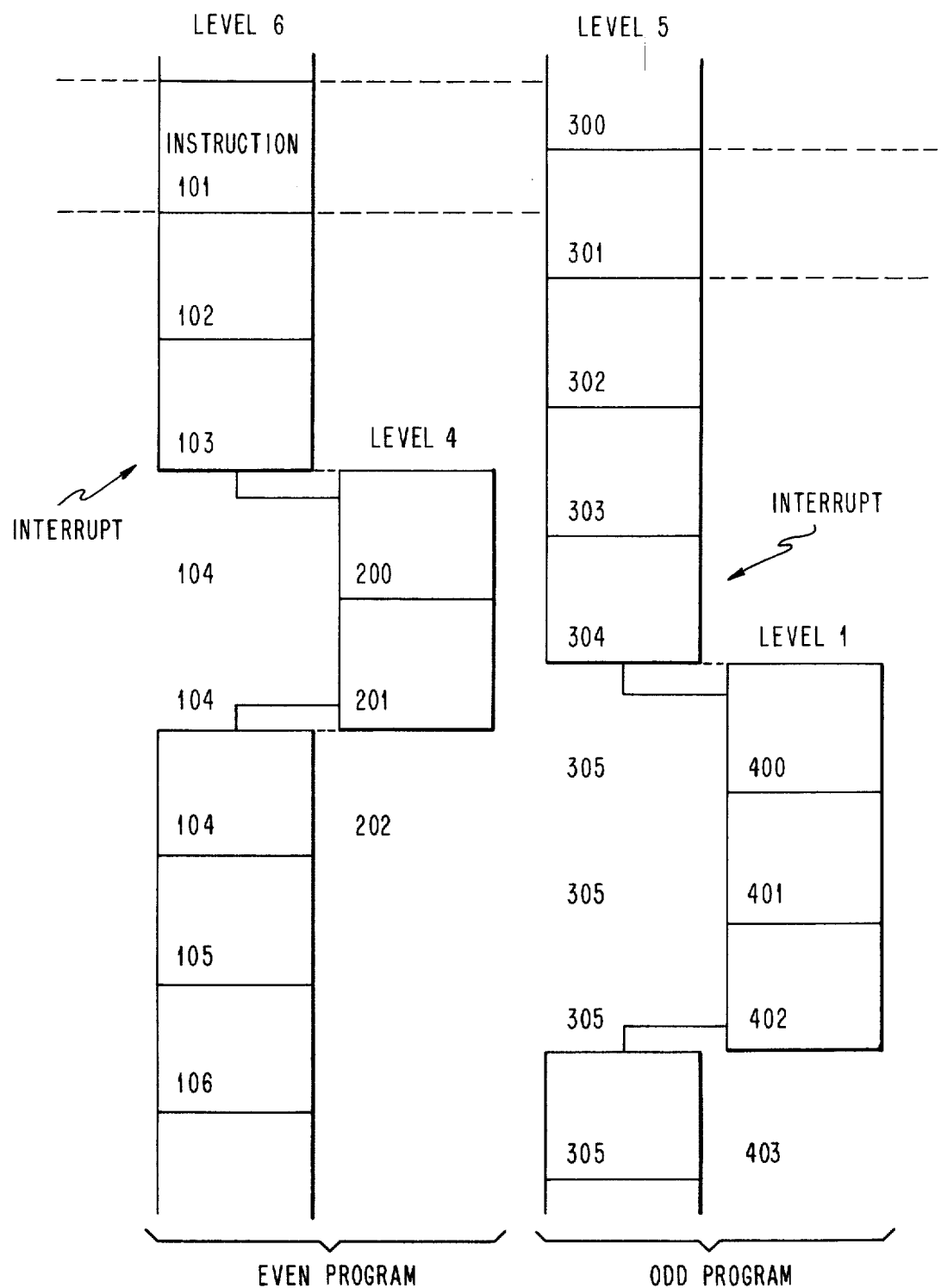
FIGS. 9 and 10 show the functional diagram of the control unit.
Figure 10:
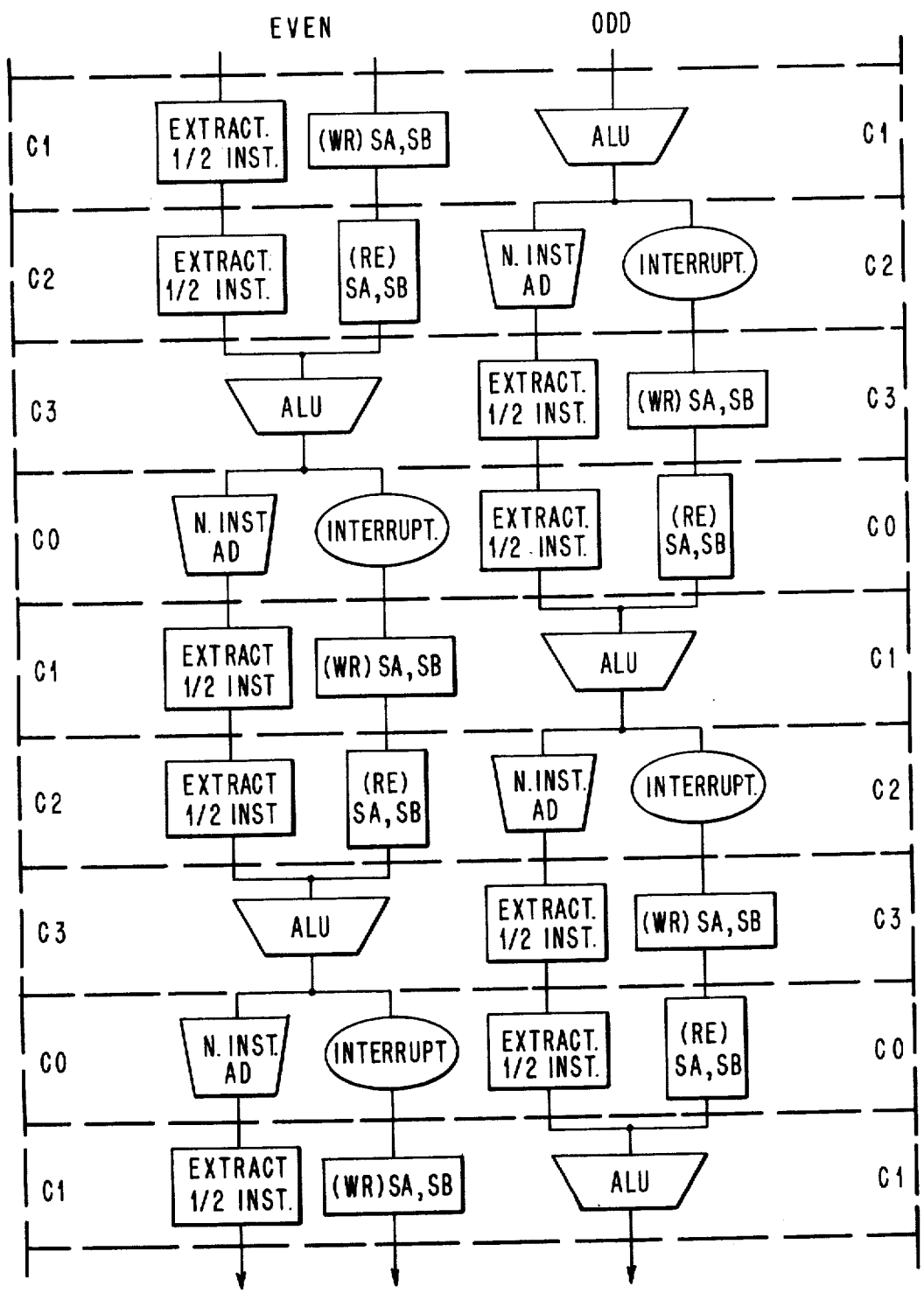

Therefore, the control unit may operate on two interleaved program sets, each one having its own priority feature. For example, as shown on FIG. 9, the processing of a program of level six is interrupted after the execution of its instruction 103, to go to priority level four (a new unit with a priority higher than the unit operating with the level six program is requesting service). Instructions 200 and 201 are executed for the new unit. Then, the program returns to priority level six, at the next instruction 104 and carries on. A similar process is being carried out among the programs belonging to the odd priority levels where the level 1 instructions 400 – 402 are performed between instructions 304 and 305 of priority level 5. Even and odd programs are thus performed interleaved in parallel. To make this possible, it is naturally necessary to arrange the elements of the control unit in a particular way allowing their best use while avoiding data loss and interprogram mixings. The time required for executing an instruction is divided in four equal clock parts $C_0$, $C_1$, $C_2$ and $C_3$. As shown on FIG. 10, during cycle $C_1$, as far as the even levels are concerned, the first half of an instruction is fetched out of storage IS and loaded into $W_0$ of IRM and a transfer (WR) of information of the previous instructions, is carried out into register sets SA and SB. The ALU unit operates on the instruction previously set into it for the odd levels. During $C_2$, for the even levels, the second part of the instruction word is fetched out of IS and the data in registers of SA and SB are read out to ALU registers A and B (RE). Meantime, the address decoding means for decoding the address of the new instruction (N-INST.AD) and the interrupt means (INTERRUPT) are assigned to the odd levels. During $C_3$, the ALU unit is assigned to the even priority programs while for the odd programs, an extraction of a first half $W_0$ of an instruction and a writing of data into registers SA and SB are carried out. At last, during $C_0$, for the even programs, the address of the next program instruction is decoded and the new interrupt level is processed; for the odd levels, the second half $W_1$ of the instruction is fetched out of IS and registers SA and SB are read within odd levels. This interleaving of storage reference operations and ALU operations enables the IS-E unit to double the number of data processing operations within a given time at only a slight increase in hardware costs. The principle additional hardware are the buffer registers such as IRM, Reg A, Reg B, Reg IN, ISAR, etc.

Figure 11:
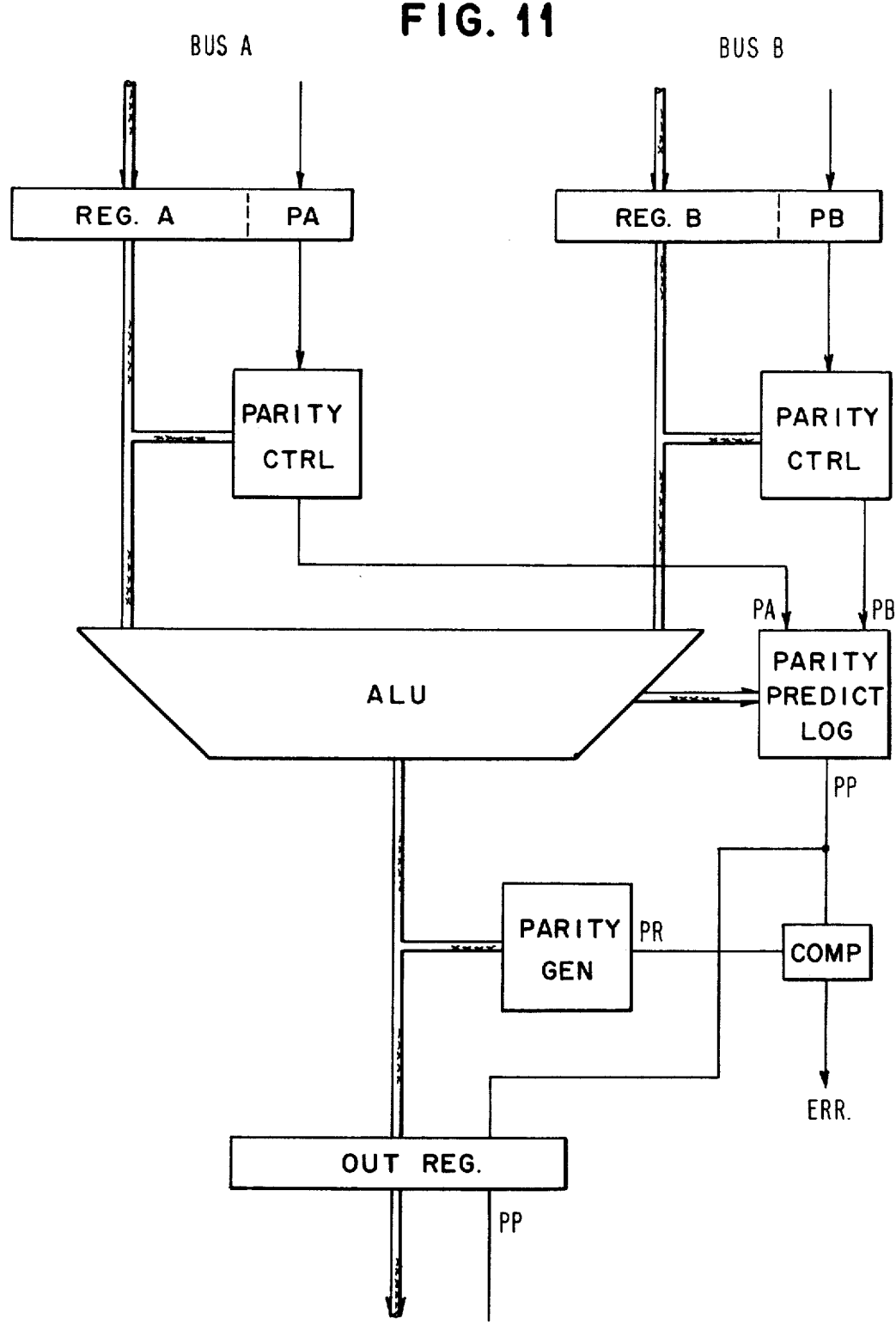
FIG. 11 shows the flow paths of the data in the control unit.

Arithmetic and logic unit ALU can be of the conventional type used in commercially available processors. It should be able to carry out at least the following operations: addition, subtraction, AND, OR, Exclusive OR, shift right, and shift left under control of instructions from $W_1$ (FIG. 7). It is provided with two input buffer registers Reg A and Reg B each able to receive and hold data while an ALU operation is in progress. These registers are provided with sections PA and PB for the parity bits. An output register OUT REG receives the result of an ALU operation. As shown on FIG. 11, a parity control device is provided for each input to ALU. The contents of PA and PB are respectively fed to an associated parity control generator PARITY CTRL. They are used to provide a parity signal PA or PB to a predictive logic device PARITY PREDICT. LOG. which generates a predicted parity bit PP. The comparison of PP with the parity bits PR generated by the PARITY GEN. fed with the output of the ALU, provides an error signal ERR if the bits are different. The result provided by ALU is buffered into a register OUT. REG.

Figure 12:
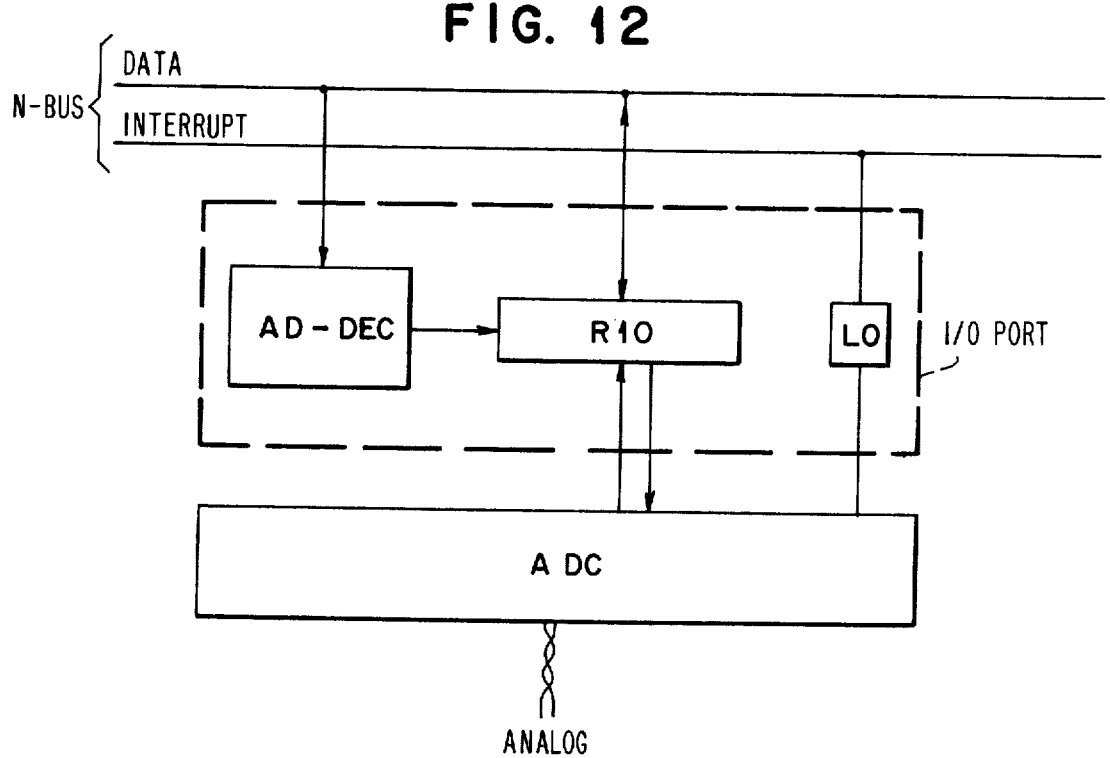
FIG. 12 shows schematically an I/O port or gate module.

It can now be seen how the computing (PMAU) and control (IS-E) units operate in association. As said above, the PMAU unit is dependent on the control unit controlling the N-BUS to which it is linked. As soon as the PMAU is ready to carry out the operations called for by a control word CW provided by unit IS-E, it introduces an interrupt request, for example, by placing a binary "1" into the latch L associated with it. It should be noted that the bidirectional N-BUS, FIG. 12, includes a section provided for the data (data bus) and another section provided for the interrupt signals (interrupt bus). When the PMAU unit feeds a binary "1" to the bus on the interrupt line assigned to its level, the control unit is informed that a CW execution has been started and that the PMAU is able to receive a new CW. The PMAU results are automatically stored into Si-S which is available to the control unit for reading or writing. These accesses to Si-S are carried out by cycle stealing. Thus, it is necessary to assign two addresses to each PMAU unit: one for the PMAU, the second one only for storage Si-S and the addition of one additional bit to the PMAU address is sufficient to distinguish between the two.

As previously noted, the control word CW for PMAU includes four bytes. To provide such a CW to the PMAU unit, the control unit executes a "write four byte" instruction.

Through another write instruction, the control unit initiates a sequence of addresses of PMAU storage Si-S, which should be processed according to the above described method. The addresses will receive the results of operations carried out by the PMAU.

Thus, by executing read or write instructions, the control unit can either cause data to be sent towards any one of the terminal elements linked to its N-BUS, or one the contrary, fetch data from any terminal.

The two modules essential to the signal processing system, namely the control unit (IS-E) and the computing unit (PMAU) operate on data sampled from a signal to be processed. The connection of each data source to the N-BUS is made through a gate or input/output part module (I/OP). Its structure is relatively simple as shown on FIG. 12. The gate shown on this figure is provided to link an analog-digital converter ADC to the N-BUS, but the I/OP module mainly includes an address decoder AD-DEC linked to the data section of the N-BUS, a register R10 and a latch Lo.

When the A/D converter or any other device linked to the I/OP, is provided with information to be sent over N-BUS to the control unit, it loads the data into register R, and sets latch Lo to logic level "1". As this latch drives a line of the interrupt section of the N-BUS, the control unit is informed of the presence of this information. When, by means of the interrupt feature (FIG. 7) the control unit is ready to handle this data, it sends on the N-BUS, the address of the related I/OP gate which then unloads its register R10 onto the data bus and resets latch Lo to zero. To allow data transfer in both directions between the control unit and the device linked to the gate, register R10 can be used as an input buffer as well as an output buffer.

Figure 13:
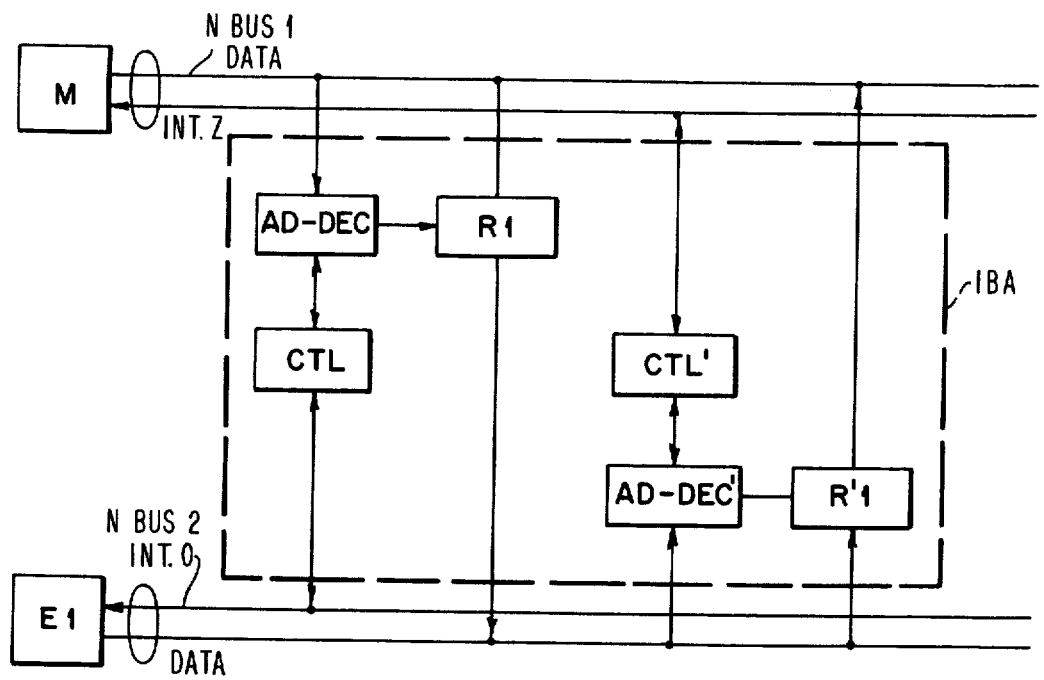
FIG. 13 shows schematically an inter-bus adapter module.

A module called Inter Bus Adapter (IBA) is provided for transfers between two sub-systems or more particularly, between a control unit operating as a master and another one operating as a slave. It consists almost entirely of two back-to-back connected I/OP as shown on FIG. 13. When the master M has to control a slave $E_1$, it sends the address of the corresponding IBA on the N-BUS and, at the same time, a write or read command. After the address has been decoded by AD-DEC, master M causes data to be loaded into Register $R_1$. Simultaneously, through a control circuit CTL, it calls slave $E_1$ by introducing an interrupt request at the highest level of slave $E_1$, by sending a bit on the level 0 interrupt line of bus N-BUS 2. After the execution of the instruction in progress in control $E_1$, it addresses the IBA, causing the unloading of $R_1$ into the N-BUS 2. The reverse operation from $E_1$ to $M_1$ is identical except for the priorities. In this case, the slave does not necessarily have the highest priority. Its priority level depends on the architecture of the overall system and of the distribution of the work loads in the various sub-systems.

Therefore, the IBA can be almost symmetrical, but it is also possible to use only one address decoder AD-DEC for both ways.

Signal processors may be built up using the above described modules. First, the functions to be performed are listed and then distributed to the appropriate ones of several sub-systems, to optimize the assembly. For instance, the invention may be illustrated by choosing an example in the telephony field and another one in the modem field. This selection of examples does not restrict the scope of this invention which can be applied to the other types of signal processors.

A telephone system should ensure the following functions; it should scan the lines connected to the extensions to detect the off-hook and on-hook status of each connected handset, provide the dial tones, recognize the dialing numbers, establish the connection between the calling and called parties, ring the called party, etc. It should be indicated that the telephone system considered in this specification is of the type using the time division multiplex (TDM) principles. A system of this type is described in French Pat. No. 73 08009 corresponding to U.S. Pat. 3,963,870, issued June 15, 1976, to A. A. Couder et al and assigned to the Assignee of this invention.

First the general principles will be set out: all the extensions connected to the system are periodically scanned to detect the status changes. When an off hook condition of an extension is detected, the related extension number is recorded and a dial tone signal is provided to the calling party which then knows that it can dial the number of the requested extension. As soon as the latter is identified, it is given a ring signal. Then an ensuing off-hook status of the requested extension's handset is noted and the connection is established by assigning the same time slot in the multiplexing cycle to the two extensions to be connected. This operation gives them a simultaneous access to TDM BUS provided to convey the data between the phones.

Figure 14:
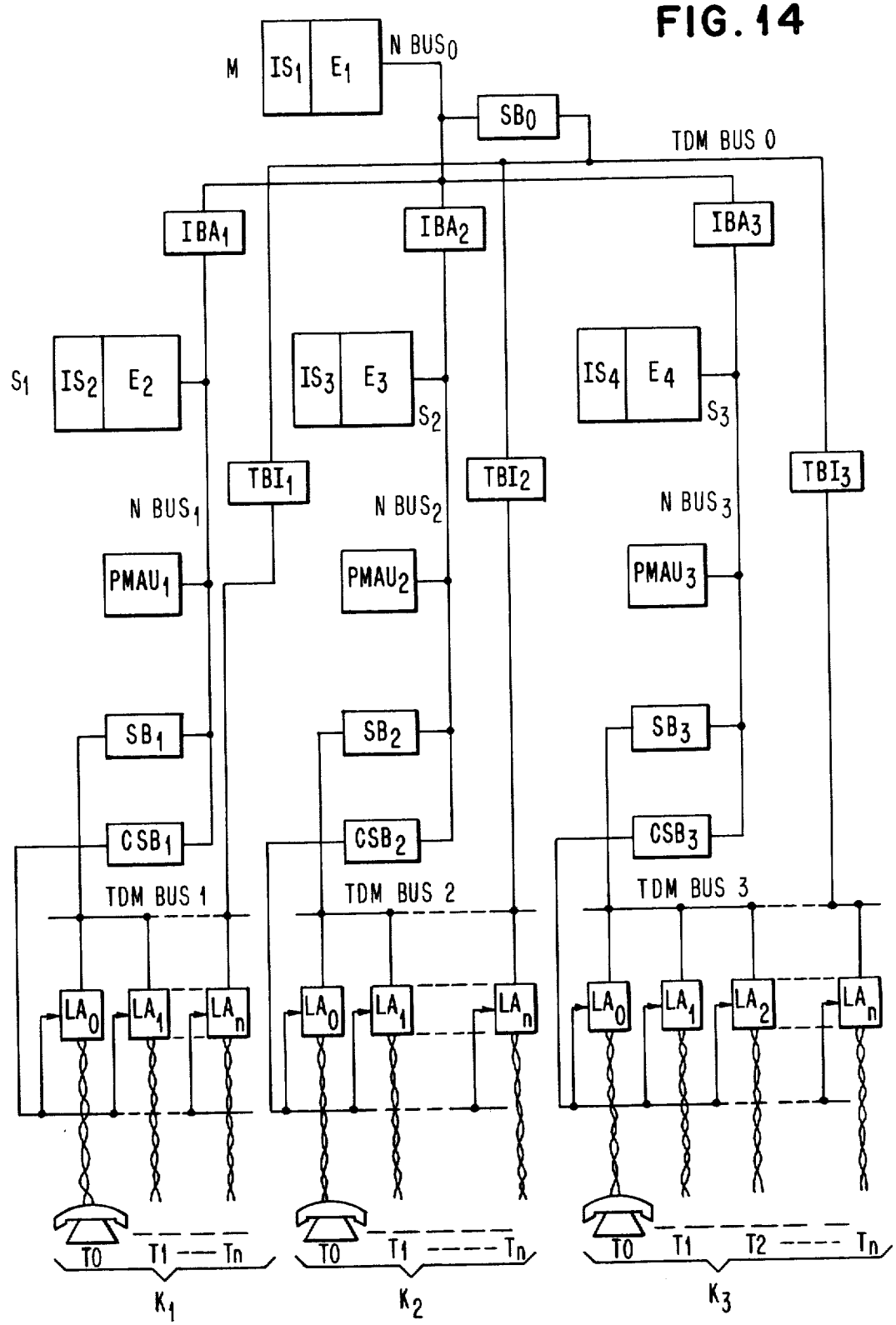
FIG. 14 is a block type diagram indicating how a number of time division multiplexed telephone systems are combined into a wider system.

FIG. 14 shows a telephone system provided to serve a plurality of extensions divided into three groups $K_1$, $K_2$ and $K_3$. Each group is connected in a subsystem including a control unit connected to an N-BUS provided with one PMAU and two I/OP. The subsystem gate SB provides for the connection of a TDM-bus connected to the extensions $T_0$, $T_1$, ..., $T_n$, through their adapters $LA_0$, $LA_1$, ..., $LA_n$. Each adapter LA includes a conventional line circuit and A/D and D/A converters. The second gate (CSB) of the subsystem times the connection of the TDM bus to a line assigned to the telephone extension control. It will ensure the scanning and ringing operations, the detections of the changes of status, etc.

The distribution of the extensions into several groups, $K_1$, $K_2$, and $K_3$ provides a solution for problems raised by the distances between the geographical locations of such extensions. The extensions of a local group could be handled by a subsystem. The overall control requires the use of a master M to which the other control units $S_1$, $S_2$ and $S_3$ are slaved. The N-BUS 0 connected to the master is, therefore, connected to buses N-BUS 1 to N-BUS 3 of the slaves, through adapters IBA to IBA 3. A gate $SB_0$ can connect a bus TDM 0 to the N-BUS 0. Each TDM bus of a subsystem is linked to TDM Bus 0 through a TDM bus interface unit bearing reference $TBI_1$, $TBI_2$ or $TBI_3$.

In operation, the timing can be as follows: each control unit $E_2$, $E_3$ and $E_4$ continually scans the line adapter circuits LA linked to the group K under its control, by sequentially and cyclically sending their address associated with a read command through its gate CSB. Assume that LA 0 of group $K_3$ is linked to a calling telephone set. When this set addressed by control unit $E_4$, control unit $E_4$ receives from LA 0 an indication of its change of state (handset off hook). Control unit $S_3$ having recorded the address of extension $T_o$ and thus being informed of the call, will send through gate SB3, the conventional dial tone to $LA_0$ and thus to calling set $T_0$. This tone must first be generated. For this purpose, $S_3$ causes PMAU3 to perform this operation (described in detail later) by supplying a CW to it to control the type of dial tone required. The calling party, at extension $T_0$ is informed by receipt of the tone, that he can begin to enter the phone number of the called extension. Control unit $S_3$ collects the dialing digits by its scanning operations through gate $CSB_3$ and sends them toward master M through gate IBA3, according to the above-described technique for making the connection between master and slave. For example, let it be assumed that the called extension is $T_n$ of group $K_1$. The master identifies this extension and determines to which control unit it is connected. Therefore, it requests from $S_1$ the access to $T_n$ belonging to its group. Slave $S_1$ sends through CSB1, a ring control message to $T_n$. While $T_n$ is rung, $S_1$ informs the master which then asks $S_3$ to provide a ring back message to calling extension $T_o$, through gate SB3. This message is another type of tone which will be generated by PMAU3 as required by $S_3$, by providing to said PMAU3, the CW corresponding to the required function. The off-hook status of called extension $T_n$ is detected by $S_1$ during sequential scanning of the $K_1$ extensions. Then, this control unit provides to $T_n$, a stop ringing instruction through CBS1 and $LA_n$. The connection can be established by the master. For this, the same time slot $T_i$ of the TDM BUS 0 is assigned by master M, to both interfaces $TBI_1$ and $TBI_3$. These interfaces ensure the time slot assignments to complete the link between TDM BUS 0, TDM BUS 3 and TDM BUS 1. This means that the contents of TDM BUS 1 appearing during the time slot assigned to $T_n$ in the scanning cycle of group $K_1$ are stored into a register of $TBI_1$ (see FIG. 14); that the contents of this register constitute the data to be transmitted on TDM BUS 0 during $T_i$; and that the contents of TDM BUS 0 during this time slot $T_i$, should be placed on TDM BUS 3 during the time slot provided for scanning $T_o$ of group $K_3$.

The connection established in this way, is interrupted only when slave $S_1$ or $S_3$ detects the hanging up of one of the intercommunicating extensions $T_n$ or $T_o$. $S_1$ or $S_3$ will then indicate this on hook status to the master, which can then make available to other units the time slot which was assigned on TDM BUS 0.

This procedure is controlled by a program stored in the storages IS of master and slaves. It could have been introduced there when building the system or by carrying out the above-described IPL procedure.

It was seen above that tone signals should be, at some given part of the above-described process, provided to controlled extensions. Said tones will be generated by the PMAU when receiving a control word CW. Tone signals of various frequencies and amplitudes are required in telephone system, as known in the art. All these frequencies are, in this case, generated from digitally represented samples of a half-cycle of a basic sine wave (see FIG. 15A) which samples are held in storage Si-S of the PMAU. From these samples, the digital to analog converters in the line adapters LA can build harmonic sine waves. In the present case, the tone signal samples are linear combinations of the samples of two harmonic frequencies Sp and Sq, the sample amplitude being determined from the following formula:

$$S = \alpha Sp + \beta Sq$$

where $\alpha$ and $\beta$ are constant coefficients.

Therefore, the signal can be synthesized by the PMAU unit. Control Unit IS-E indicates to the PMAU unit the type of tone wanted at a given moment. Thus, the values of parameters $\alpha$ and $\beta$ are defined, as well as the frequency characteristics of the samples of Sp and Sq. FIG. 15B shows the arrangement of data in storage Si-S. Coefficients $\alpha$ and $\beta$ are stored twice namely $\alpha$ and $\beta$ in addresses B and B+1 and $-\alpha$ and $\beta$ in addresses C and C+1, respectively. Data X represent the samples $X_o$ to $X_n$ of the half cycle of the basic sine wave of frequency F, and is stored in addresses A to A+n. A routine corresponding to the tone generation is written in control storage CB of the PMAU. Sp and Sq represent samples of sine waves of frequencies $f/p$ and $f/q$, respectively, where $p$ and $q$ are integers. FIG. 15C shows the format of the control word CW provided by unit IS-E to instruct the PMAU unit to build tone samples. Byte 4 provides the Op-Code. Bits 2 to 4 of that byte supply the code identifying the requested tone, the characteristics of which will be, then, defined in device CB of the PMAU unit. Bytes 1 to 3 of the CW provide pointers PTR1 to PTR3. The PMAU unit uses PTR1 to fetch α or −α out, the corresponding β being in the next address. A flag appears at the address following each group (α,β), PTR2 and PTR3 define the output frequencies Sp and Sq. The results of the operations performed by the PMAU unit are written into a table (Result) provided for this purpose in Si-S and will be provided by the PMAU unit to the control unit, then transmitted to the D/A converter associated with the telephone extension requiring the tone.

Figure 15D:
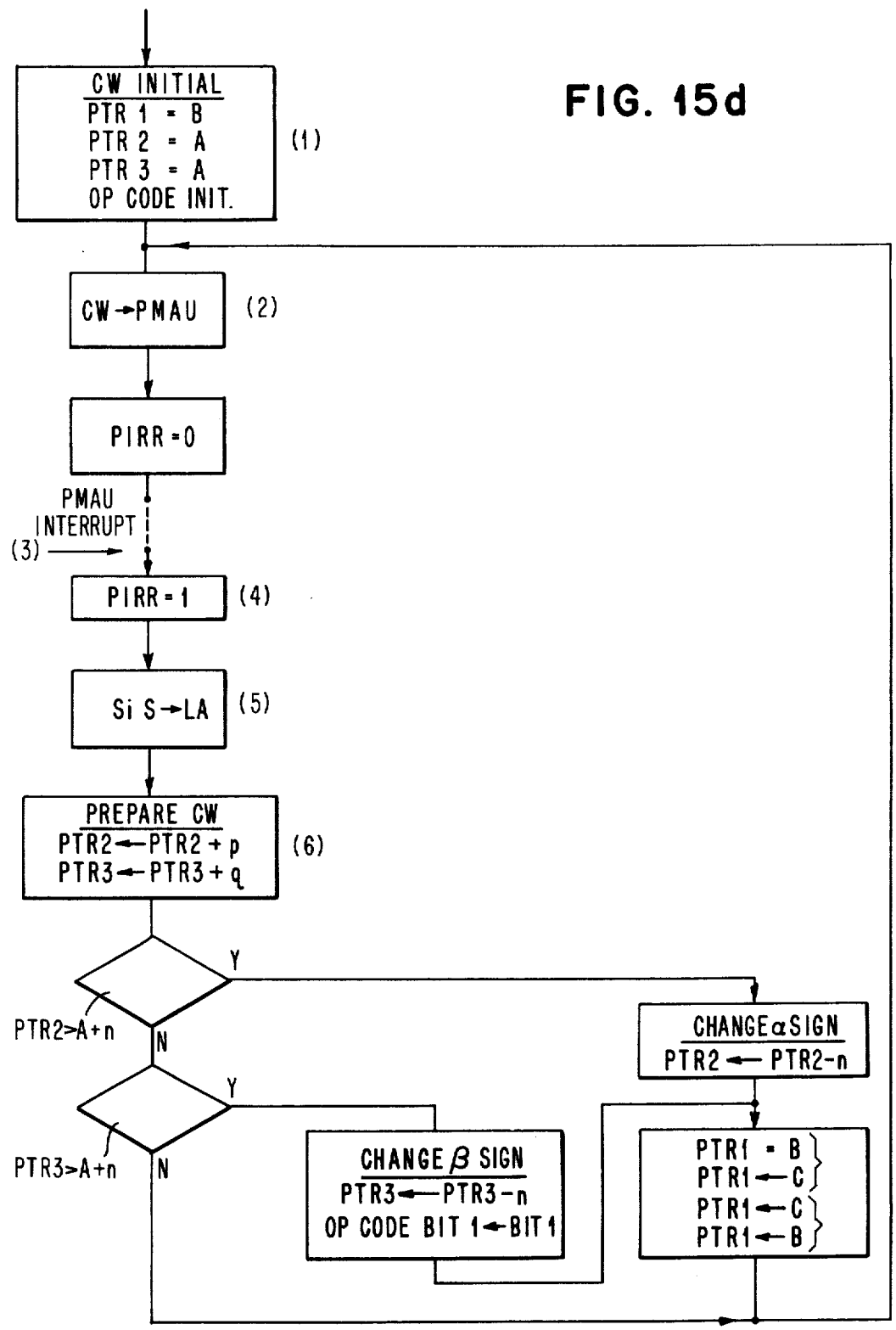
FIG. 15d is a flow chart for the program in a slave control unit.

FIG. 15D shows the operating diagram for the slave control unit. When IS-E starts to operate, the CW is loaded into a register (step 1) and is ready to be sent to PMAU. Then the first CW is sent to the PMAU unit (step 2) and the PMAU interrupt level is reset to zero as no further data or control is needed at this time. The program waits for the interrupt command (step 3) provided by the PMAU unit when the requested operation is finished. When the IS-E receives this interrupt request, the corresponding level is set to one (step 4) in device PIRR. The result of the calculation is then read under orders from IS-E into storage Si-S of the PMAU unit and sent to the circuit LA (step 5) requiring the tone where the result will be converted into analog mode. In step (6), the new CW is prepared by adding the values $p$ and $q$ to the addresses in PTR2 and PTR3, respectively. The program of the control unit checks that the new pointers do not exceed A+n. If they do, they are reduced by their modulo $n$ value and the corresponding sign is modified. Then, the control unit sends the new CW as above and the sequence starts again to determine the next sample value.

The foregoing shows the advantages of this invention in the telephone field, but the invention is not limited to this domain. Each time a signal conveying any information whatsoever should be processed, this invention can be used. Each time, the PMAU combinations of functions, as well as the programs and processes may change, but the basic principles of organization remain the same.

For example, assume that a data transmission system is to be assembled. The information signal can be transmitted to its addressee only after having been submitted to a number of processes including, in particular, a modulation at the emitting end and a demodulation at the receiving end. The device carrying out these operations is known as a modem (modulator-demodulator). A plurality of descriptions of analog or digital modems can be found in the literature, in particular in the article by M. Choquet and H. Nussbaumer published in the IBM Journal of Research and Development, Vol. 15, 1971, concerning the emission of signals. An implementation of this type of emission is also described in U.S. Pat. No. 3,747,024, issued July 17, 1973, to M. F. Choquet et al and assigned to the Assignee of this invention.

At the receiving end, it is necessary to sample, filter and equalize the input signal before extracting the data. In order to carry out these operations in the appropriate way, they should be executed at a suitable clock rate and with a correct initial phase.

Figure 16:
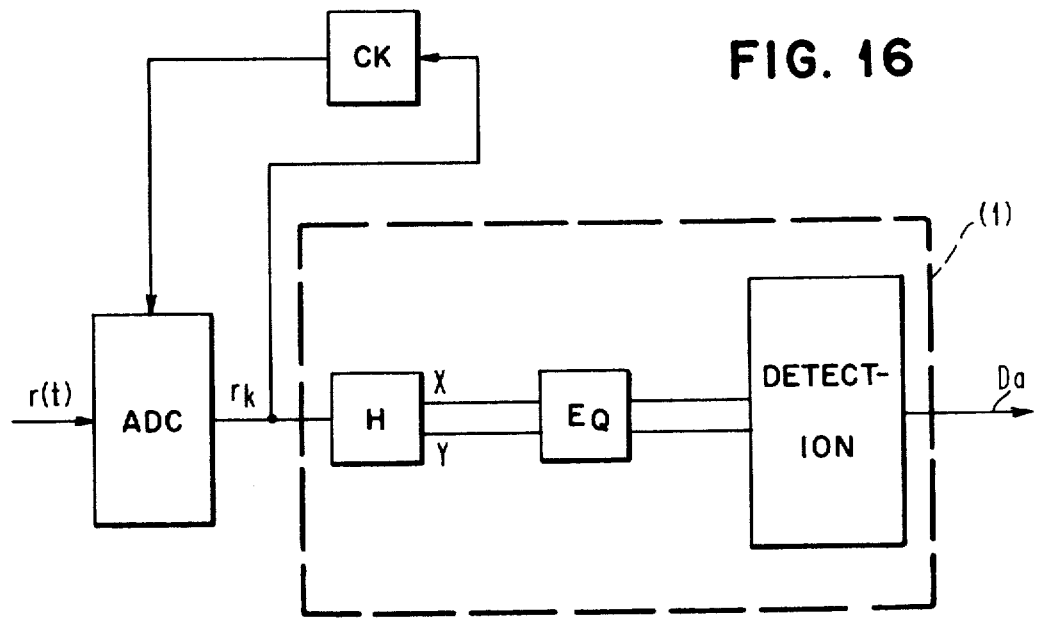
FIG. 16 is a block diagram of a data receiver in a communication system.

As shown on FIG. 16, a receiver will include an ADC converter in which the analog signal $r(t)$ received from the communications line is sampled at the rate of a clock signal generated by clock circuit CK. Samples $r_k$ thus obtained, are transmitted to a Hilbert transformer H driving an equalizer EQ which feeds a detector. A detailed description of these devices can be found in U.S. Pat. No. 3,908,896, issued Sept. 30, 1975, to J. L. Mourolin; U.S. Pat. No. 3,947,768, issued Mar. 30, 1976, to A. E. Desblache et al; and U.S. Pat. No. 3,825,737, issued July 23, 1974 all assigned to the Assignee of this invention.

Figure 17:
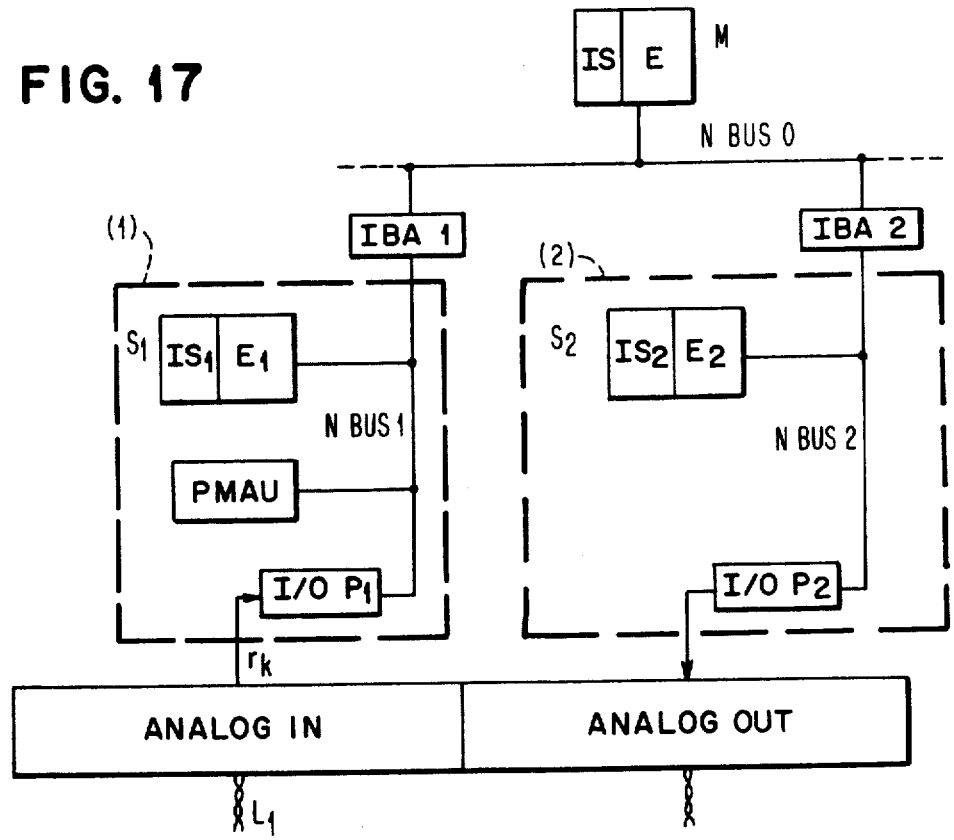
FIG. 17 is a block diagram of a modem according to this invention.

A modem using this invention is shown on FIG. 17. It includes a control unit IS-E operating as a master and having its N-BUS 0 connected throgh $IBA_1$ and $IBA_2$ to N-BUS 1 and N-BUS 2 respectively belonging to slaves $S_1$ and $S_2$. Slave $S_1$ controls a calculation unit PMAU and a gate $I/OP_1$ connected to an analog input interface (FIG. 16). This section of the modem, in conjunction with the master, performs the receiving function. Slave $S_2$ is linked to an interface analog OUT. The master and $S_2$ assembly performs the transmission function. For a better understanding of the invention, it is assumed that an 8-phase modem is considered, in which the phase information requires, therefore, three bits in order to be defined. Also, it is assumed that the A/D conversion and clock information retrieval functions referenced ADC and CK on FIG. 16, are performed in an analog mode, according to a conventional way by analog circuits included in the interface analog IN. Therefore, said circuit delivers samples $r_k$ to gate $I/OP_1$. Sub-system (1) including $S_1$, the PMAU unit and gate $I/OP_1$ will ensure the Hilbert, equalization and detection functions of FIG. 16. Of course, it is also possible to have the ADC and CK functions performed by a sub-system controlled by $S_1$.

Figure 18:
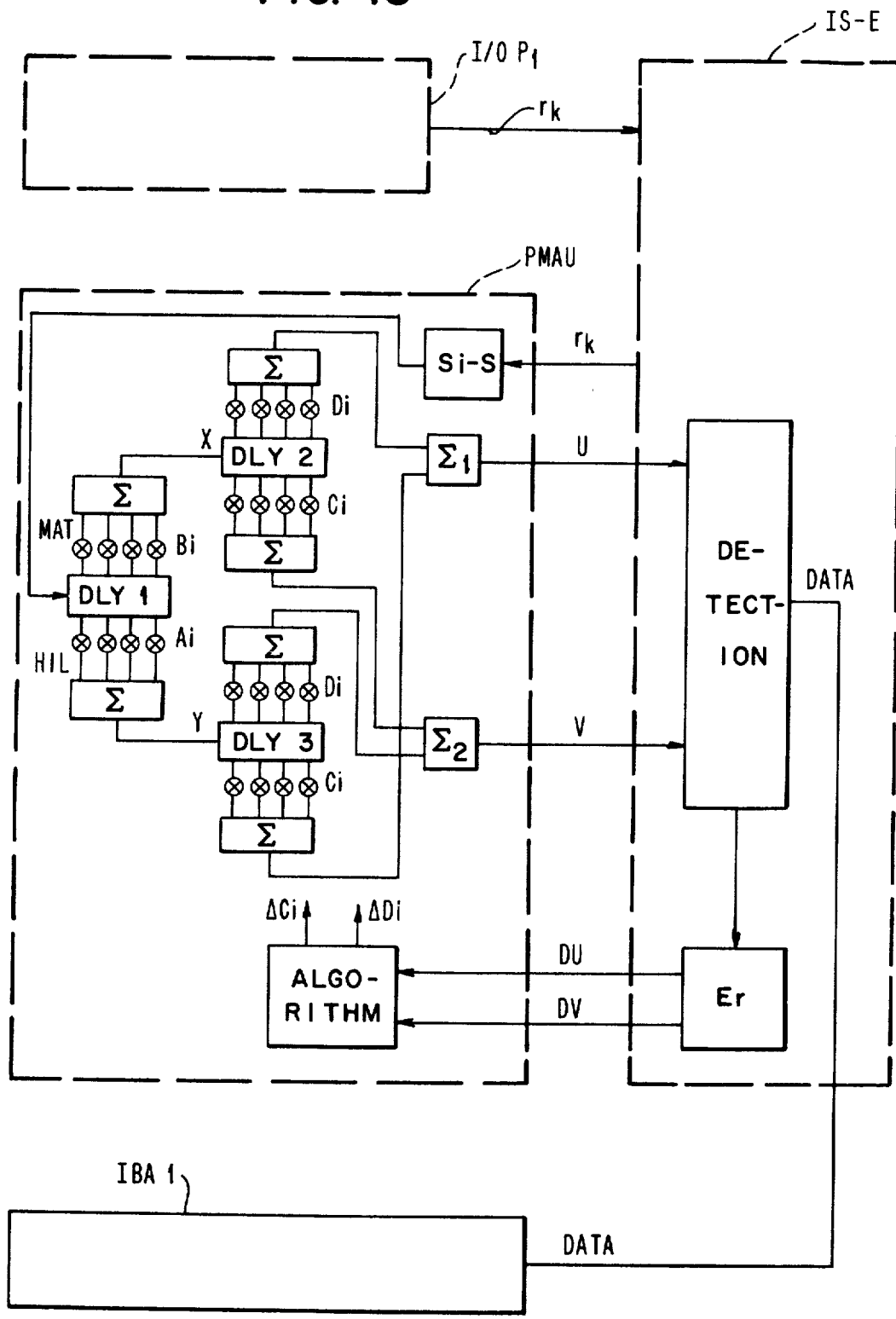
FIG. 18 is a diagram showing the distribution of tasks in the system of FIG. 17.

FIG. 18, shows a functional diagram of FIG. 17 giving the distribution of the tasks among the various elememts of sub-system (1) of FIG. 16. This sub-system reads samples $r_k$ from the register of gate I/OP and writes the samples into storage Si-S of the PMAU unit. These samples are used by the PMAU to perform the Hilbert and equalization functions. As already described in the above-noted Patents 3,908,896 and 3,947,768, the functions are performed by using transversal filters with coefficients $A_i$, $B_i$, $C_i$, $D_i$ and adders 1 and 2. Samples $r_k$ are sent into a first shift register DLV1 used by both transversal filters MAT and HIL and having coefficients $B_i$ and $A_i$ respectively.

Samples X and Y issued from these two filters are introduced into shift registers DLY2 and DLY3, respectively, wherein each one is used to build transversal filters with coefficients $c_i$ and $D_i$. The outputs of these filters are combined in adders Σ1 and Σ2 to provide signals U and V. As seen earlier, the PMAU unit is well-suited to perform these functions. Therefore, the control unit provides a CW and samples $r_k$ to said PMAU, by controlling their transfer and the PMAU unit provides the data words corresponding to the U and V samples back to the control unit having performed the "transversal filtering" functions and made the sums of the results of these operations. In digital phase modulation, each pair U, V represents the cartesian coordinates defining the requested information for the data signal DATA. (Refer to the above-indicated IBM Journal). From the examination of U and V, in DETECTION, units IS-E recovers in the case of an eitht phase modem, the value of the received three bit byte by a table look-up procedure. Then, these bits are sent to the IBA in order to be transmitted to the master control unit which should continue data processing. Also, the values of coefficients $C_i$ and $D_i$ of the equalizers should be modified from time to time. Control unit IS-E computes in Er an error term $(Er)'$ the cartesian components of which are $DU = U_o - U$ and $DV = V_o - V$, where $U_o$ and $V_o$ are the theoretical components; and U and V are the values effectively received. Information concerning DU and DV is provided to the PMAU which will compute variations $\Delta C_i$ and $\Delta D_i$ to be applied to coefficients $C_i$ and $D_i$ to minimize the error on U and V. In this case, the control unit provides, to the PMAU unit, CW's for performing these algorithms.

As seen above, slave $S_1$ provides to the master, 3-bit bytes extracted from the signal received on line $L_1$ and representing phase information. These bits do not constitute, yet, the requested final information. First, master M should submit said bytes to a "descrambling" operation. In effect, before being introduced on the line, at the transmission end, the data bits may have been modified in accordance with a previously defined algorithm. For example, zeros may have been systematically forced into the trains of data bits before the data is sent on the line. This constitutes a "scramblind" operation which makes the transmission on the line and the retrieval of the clock information at the receiving end, easier.

As the descrambling operation requres only logic functions to be performed, it is carried out by master M. For example, said master M carries out modulo 2 additions on the received bits.

The descrambled bit train provides a second train which is split up into waords by the master. The splitting phase is under the master's control which sorts the bits to keep the useful bits only and transmits the useful bis on its N-BUS to user devices (not shown).

At the transmission end, the master carries out operations complementary to the above-described ones. Therefore, it provides groups of three bits to slave $S_2$. In phase digital modulation, each 3-bit byte indicates a phase and a signal element corresponds to each phase. (For a detailed description of the digital transmission, refer to the above-indicated reference and to above-cited U.S. Pat. No. 3,908,896.

For an 8-phase modem, there are only eight possible signal elements. Each signal element is, itself defined by a given number of samples, which altogether form a word, Therefore, the eight phases are represented by eight words initially loaded in storage IS of slave $S_2$ through the IPL procedure.

As indicated in the above-cited patent, additions of the signal element samples corresponding to the last byte received from master M and to a given number (five, for example) of preceding signal elements should be performed. These operations can be carried out by slave $S_2$. The signal elements fetched out of IS on each arrival of a byte $S_2$, are loaded into registers belonging to the stack SB of E2 (see FIG. 7). When a new byte arrives at time i, a new word $S_{ei}$ is introduced into SB and causes word $S_{ei-6}$ to be shifted out. The opertions carried out prior to the arrival of a new byte into $S_2$ are only additions and accumulations which will be carried out by mainly using ALU and stack SB. The results of these accumulations provide words fed to the line interface "analog out" through a gate $I/OP_2$. This circuit carries out the D/A coversion and, as required, output filtering operations, prior to driving the output line $L_1$.

These two examples show the advantages of the present invention applied in the signal processing domain. But, while the invention has been particularly shown and described with reference to the preferred embodiment thereof, it will be understood by those skilled in the art that various changes in form and details may be made therein without departing from the spirit and scope of the invention.

What is claimed is:

1. A digital signal processing system for modifying time-varying input signals by performing one of a number of predetermined series of mathematical functions on samples of said time-varying input signals to provide samples of time-varying output signals of said system, said system including:
   an input means receiving samples in digital form of signals to be processed;
   an output means to supply samples of processed signals;
   a plurality of subsytems connecting said input and output means, each subsystem including:
   at least one input/output port for interconnection with one or more of said input means or said output means;
   a bidirectional bus for interconnection with said at least one input/output port,
   a control unit connected to said bidirectional bus to receive samples of said time-varying input signals from said port and to generate control words in response thereto;
   at least one arithmetic unit connected to said bidirectional bus to receive data and control words from said control unit for performing mathematical operations on said data, said mathematical operations comprising multiplications of data terms and summations of the products of said multiplications to represent samples of said time-varying output signals; and
   interbus adapting means for coupling said busses of said subsystems in a tree type structure of a plurality of levels having master-slave relationships between subsystems of different levels for increasing the processing power of the digital signal processing system.

2. A signal processing system as set out in claim 1 characterized in that each of said interbus adapting means includes:
   at least one address decoder responsive to a predetermined combination of signals on a first coupled bus of a substystem;
   at least one data register activated by said address decoder to transfer data to or from said coupled bus; and
   at least one latch settable to signal a second connected subsystem bus when said register has transferred data to or from said first subsystem bus.

3. A signal processing system as set out in claim 1 characterized in that said control unit includes:
   an instruction storage device having addressable storage locations containing instructions of an operating program;
   an address register connected to said storage device to control accessing of said storage locations;
   a logic unit including:
      an instruction register connected to said instruction storage device to receive instructions of said storage device;
      a pair of operand registers selectively connectable to said storage device or to said bidirectional bus to receive operands;
      a computational and logic unit connected to said operand registers to receive operands therefrom and to transfer processed operands to said storage device and to said bidirectional bus;

an address-forming device connected to said instruction register and acting to generate the next instruction address of the said operating program being performed; and a plurality of registers, one for each level of interrupt in said series of mathematical functions and connected to receive from said address-forming device, the updated instruction address of the series being performed; and selective connections based upon predetermined priority criteria, for selecting the register among said plurality of registers, the content of which is to be transferred into said address register.

4. A signal processing system as set out in claim 1 and characterized in that said arithmetic unit includes:

an interface means connected to said bidirectional bus to transfer data and control information to and from said arithmetic unit;

a storage device having a plurality of addressable storage locations and connected to said interface means;

a storage output register connected to receive operands from said storage device;

a first set of registers connected to said bidirectional bus and activable to store a control word provided on said bidirectional bus;

a plurality of address registers connectable to said storage device to provide storage location addresses thereto;

a set of increment registers settable by said first set of registers to desired increment values;

an adder selectively connected on one input to one of said address registers and selectively connected on a second input to one of said set of increment registers to generate new storage addresses;

first circuits from said adder to said address registers to selectively enter said new storage addresses into said address registers;

a multiplier-accumulator connected to said storage output register to perform multiplication operations and accumulations of results of said multiplication operations on pairs of operands provided by said storage output register;

a second circuit between said storage and said multiplier-accumulator for transferring output operands from said multiplier-accumulator to said signal storage; and gates between said storage output register and said interface means to pass stored operands to said interface means.

5. A modem of the digital phase modulation type, said modem including:

a bidirectional bus;

a master control unit connected to said bus to control data transfers over said bus;

a receiving section including:
an input receiving a digital phase modulated analog signal;
an analog-to-digital converter connected to said input and operating to generate sequential digital representations of samples of said digital phase modulated analog signal;
a first slave subsystem between said converter and said bidirectional bus, said first slave subsystem including:
a first slave bidirectional bus;
a first slave control unit connected to said first slave bidirectional bus;
a first arithmetic unit connected to said first slave bidirectional bus; and
a first port connecting said analog-to-digital converter to said first slave bidirectional bus; said receiving station accepting analog signals and performing sampling and filtering operations to generate digital signals representing received data;

a transmitting section including:
a digital-to-analog converter connected to a transmission line to supply digital phase modulated analog signals thereto;
a second slave subsystem between said digital-to-analog converter and said bidirectional bus, said second slave subsystem including:
a second slave bidirectional bus;
a second slave control unit connected to said second slave bidirectional bus; and
a second port connecting said second slave bidirectional bus to said digital-to-analog converter; and said second slave subsystem receiving blocks of data to be transmitted and performing buffering and line control operations to provide control signals to said digital-to-analog converter; and a pair of interbus adapter units, one connecting said bidirectional bus to said first slave bidirectional bus and the other connecting said bidirectional bus to said second slave bidirectional bus.

6. A time division multiplex telephone system comprising a plurality of telephone units, each including a line adapter, with said units being separated into a plurality of groups, said system comprising:

a master control unit;

a bidirectional signaling bus connected to said master control unit;

a time division multiplexing bus also connected to said master control unit; and a plurality of slave subsystems, one for each of said groups, each slave subsystem including:
a slave control unit;
a slave computing unit for performing mathematical operations including the formation of sums of products of operands to generate digital representations of tone signals;
a first subsystem gate;
a second subsystem gate;
a bidirectional slave bus connected to each of said slave control unit, said slave computing unit and said first and said second subsystem gates;
an interbus adapter connecting said bidirectional slave bus to said bidirectional signaling bus;
a slave time division multiplexing bus connected to all of the line adapters of the associated group and to said first subsystem gate;
control connections from said second subsystem gate to said line adapters of said associated group; and
a multiplexing bus gate between said slave time division multiplexing bus and said time division multiplexing bus;

whereby each slave subsystem will detect status changes in any of said telephone units of an associated group, will provide tone signals to selected ones of said telephone units over said slave time division multiplexing bus and will establish communications between telephone units of a group over said time division multiplexing bus; and whereby said master control unit is responsive to signaling requests from said slave subsystems to selectively establish communication connections between said slave time division multiplexing busses of at least two of said slave subsystems over said time division multiplexing bus.

* * * * *